US012779321B2

(12) United States Patent
Daniel et al.

(10) Patent No.: US 12,779,321 B2
(45) Date of Patent: Nov. 3, 2026

(54) INFORMATION PROCESSING APPARATUS, OPERATION APPARATUS, INFORMATION PROCESSING METHOD, AND COMPUTER PROGRAM

(71) Applicants: Sony Interactive Entertainment Inc., Tokyo (JP); Sony Interactive Entertainment LLC, San Mateo, CA (US)

(72) Inventors: Alvin Julian Daniel, Redwood City, CA (US); Yuka Mizuta, Tokyo (JP); Makoto Nishida, Tokyo (JP); Shoi Yonetomi, Kanagawa (JP); Yurika Kondo, Tokyo (JP)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 224 days.

(21) Appl. No.: 18/660,263

(22) Filed: May 10, 2024

(65) Prior Publication Data

US 2024/0382834 A1 Nov. 21, 2024

Related U.S. Application Data

(60) Provisional application No. 63/466,431, filed on May 15, 2023.

(51) Int. Cl.
*A63F 13/22* (2014.01)
*G06F 3/02* (2006.01)
*G06F 3/0338* (2013.01)

(52) U.S. Cl.
CPC ................ *A63F 13/22* (2014.09); *G06F 3/02* (2013.01); *G06F 3/0338* (2013.01)

(58) Field of Classification Search
CPC ........ A63F 13/211; A63F 13/22; A63F 13/23; A63F 13/24; A63F 13/428; A63F 13/92;
(Continued)

(56) References Cited

U.S. PATENT DOCUMENTS

| | | | | |
|---|---|---|---|---|
| 2008/0202823 | A1 | 8/2008 | Won et al. | |
| 2010/0087252 | A1 | 4/2010 | Tan et al. | |
| 2018/0126262 | A1* | 5/2018 | Miwa | A63F 13/533 |
| 2024/0281064 | A1* | 8/2024 | Blair | G06F 3/0338 |
| 2024/0382833 | A1 | 11/2024 | Daniel et al. | |

FOREIGN PATENT DOCUMENTS

| | | | |
|---|---|---|---|
| JP | S63206821 | A | 8/1988 |
| JP | H10028777 | A | 2/1998 |

(Continued)

OTHER PUBLICATIONS github.com [online], "retrospy/RetroSpy," Oct. 9, 2020, retrieved on Apr. 14, 2026, retrieved from URL<http://web.archive.org/web/20201009020944/https://github.com/retrospy/Retro Spy>, 5 pages.

(Continued)

*Primary Examiner* — Lawrence S Galka
(74) *Attorney, Agent, or Firm* — Fish & Richardson P.C.

(57) ABSTRACT

Disclosed herein is an information processing apparatus connected with an operation apparatus including a first operation member whose input operation by a user is detected as information on a two-dimensional plane and a second operation member different from the first operation member. The information processing apparatus includes a determining section that determines a positional relation between the first operation member and the second operation member according to input operation on the operation apparatus in a predetermined mode, and a setting information registering section that causes the operation apparatus to store setting information including information regarding the positional relation between the first operation member and the second operation member.

20 Claims, 18 Drawing Sheets

(58) Field of Classification Search
CPC .. A63F 2300/6045; G06F 3/02; G06F 3/0304; G06F 3/0338; G06F 3/0346
See application file for complete search history.

(56) References Cited

FOREIGN PATENT DOCUMENTS

| | | | |
|---|---|---|---|
| JP | 2000311054 | A | 11/2000 |
| JP | 2004005335 | A | 1/2004 |
| JP | 2004302580 | A | 10/2004 |
| JP | 2018077558 | A | 5/2018 |
| JP | 2020087467 | A | 6/2020 |

OTHER PUBLICATIONS

International Search Report and Written Opinion in International Appln. No. PCT/JP2024/017236, mailed on Jul. 16, 2024, 13 pages (with machine translation).

Mallery, "Quick Demo of Dreamcast support in RetroSpy," Jan. 29, 2019, retrieved on Apr. 14, 2026, retrieved from URL<https://www.youtube.com/watch?v=JrZNWUfAlr0>, 3 pages (No transcript provided as document contains no words).

partner.streamgames.com [online], "Activators, Streamworks Documentation," Oct. 28, 2018, retrieved on Apr. 14, 2026, retrieved from URL<https://web.archive.Org/web/20181028032356/https://partner.steamgames.com/doc/features/steam_controller/activators>, 3 pages.

SilentOnion "SioN", "SNES input display test", May 15, 2021, retrieved on Apr. 14, 2026, retrieved from URL<https://www.youtube.com/watch?v=fDsK5LZioKo>, 1 page (No transcript provided as document contains no words).

stackoverflow.com [online], "Off-screen enemy indicator algorithm," Jul. 8, 2011, retrieved on Apr. 14, 2026, retrieved from URL<https://stackoverflow.com/questions/6620665/off-screen-enemy-indicator-algorithm>, 3 pages.

* cited by examiner

INFORMATION PROCESSING APPARATUS, OPERATION APPARATUS, INFORMATION PROCESSING METHOD, AND COMPUTER PROGRAM

CROSS-REFERENCE TO RELATED APPLICATION

This application claims priority to a U.S. Provisional Application, Ser. No. 63/466,431, filed on May 15, 2023, which is herein incorporated by reference in its entirety.

BACKGROUND

The present disclosure relates to a data processing technology, and, in particular, relates to an information processing apparatus, an operation apparatus, an information processing method, and a computer program. There are various states or environments in which users who use applications such as games are. For example, the users also include people with physical disabilities. In addition, there is also a request for a capability that enables operation optimized according to diverse types of applications. In order to assist the use of applications by users in various states or environments, controllers having enhanced adaptability to the users (also called "adaptive controllers") have been provided. The adaptive controllers include ones that allow a user to operate, without holding them, in a state where they are placed flat on desks or floors, and also include ones that are freely customizable in terms of assignment of functions to their buttons.

SUMMARY

Improvement of the convenience of adaptive controllers has been demanded. It is desirable to provide a technology that improves the adaptability or convenience of controllers to or for various users.

According to an example of the present disclosure, there is provided an information processing apparatus connected with an operation apparatus including a first operation member whose input operation by a user is detected as information on a two-dimensional plane and a second operation member different from the first operation member. The information processing apparatus includes a determining section that determines a positional relation between the first operation member and the second operation member according to input operation on the operation apparatus in a predetermined mode, and a setting information registering section that causes the operation apparatus to store setting information including information regarding the positional relation between the first operation member and the second operation member.

According to another example of the present disclosure, there is provided an information processing apparatus. The apparatus is an information processing apparatus including a processor. The information processing apparatus is connected with an operation apparatus including a first operation member whose input operation by a user is detected as information on a two-dimensional plane and a second operation member different from the first operation member. The processor determines a positional relation between the first operation member and the second operation member according to input operation on the operation apparatus in a predetermined mode. The processor transmits, to the operation apparatus, setting information including information regarding the positional relation between the first operation member and the second operation member.

According to still another example of the present disclosure, there is provided an operation apparatus. The apparatus includes a first operation member whose input operation by a user is detected as information on a two-dimensional plane, a second operation member different from the first operation member, a setting information storage section that stores setting information which is transmitted from an external information processing apparatus and which includes information regarding a positional relation between the first operation member and the second operation member, and a transmitting section that transmits, to the information processing apparatus, a value which is related to input operation on the first operation member and which is based on the positional relation between the first operation member and the second operation member.

According to yet another example of the present disclosure, there is provided an information processing method. In this method, an information processing apparatus connected with an operation apparatus including a first operation member whose input operation by a user is detected as information on a two-dimensional plane and a second operation member different from the first operation member determines a positional relation between the first operation member and the second operation member according to input operation on the operation apparatus in a predetermined mode, and causes the operation apparatus to store setting information including information regarding the positional relation between the first operation member and the second operation member.

Note that any combinations of the constituent elements mentioned above and ones obtained by converting expressions of the present disclosure between a system, a computer program, a recording medium having stored thereon a computer program, and the like are also effective as examples of the present disclosure.

The present disclosure can improve the adaptability or convenience of controllers to or for various users.

DETAILED DESCRIPTION OF THE PREFERRED EMBODIMENT

Figure 1:
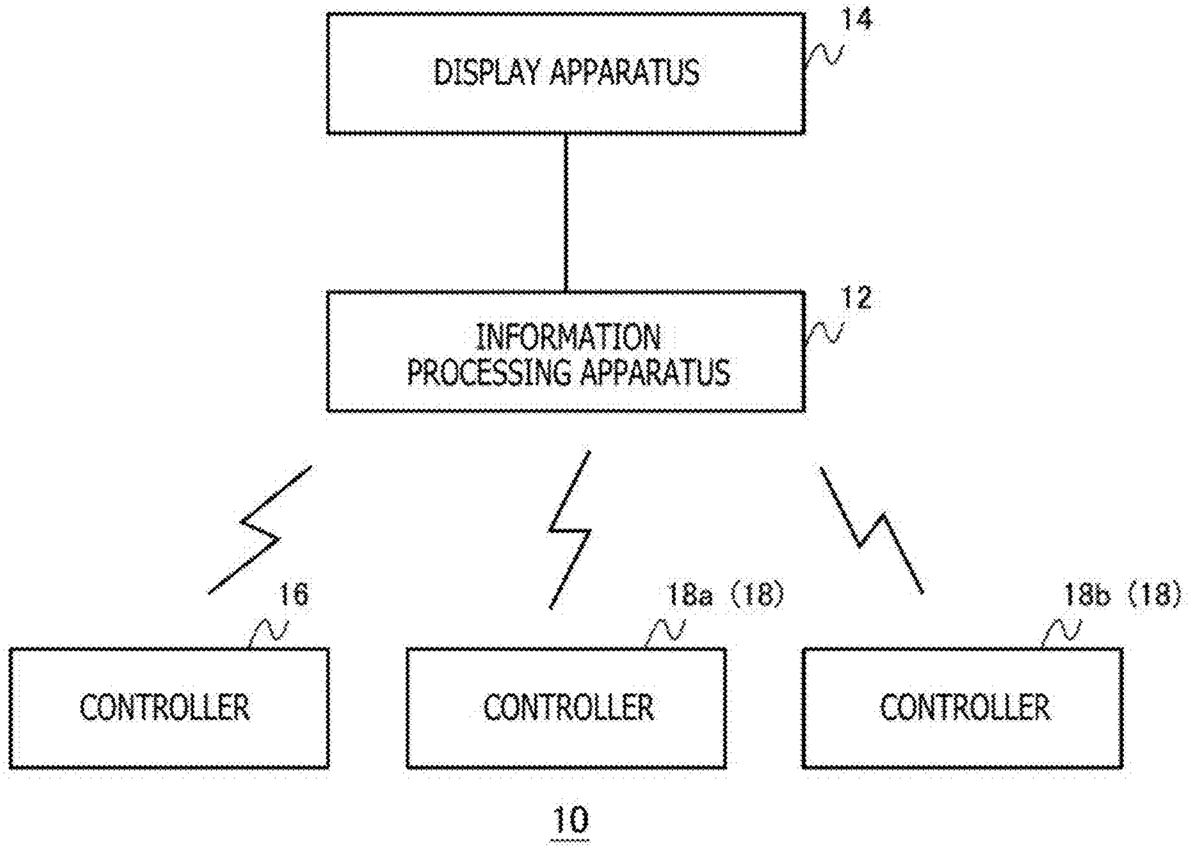
FIG. 1 is a diagram depicting a configuration of an information processing system according to an embodiment.

FIG. 1 depicts a configuration of an information processing system 10 according to an embodiment. The information processing system 10 includes an information processing apparatus 12, a display apparatus 14, a controller 16, a controller 18*a*, and a controller 18*b*. In a case where the controller 18*a* and the controller 18*b* are collectively referred to, they are called controllers 18.

The information processing apparatus 12 is a computer that can execute applications such as games, and is a non-portable game console in the embodiment. As a modification example, the information processing apparatus 12 may be a tablet terminal, a smartphone, or a server.

The controller 16 and the controllers 18 are operation apparatuses that accept operation input by users to system software or application software (e.g., a video game) executed by the information processing apparatus 12. The controller 16 and the controllers 18 serially transmit operation information representing operation input from the users, to the information processing apparatus 12. The controller 16 and the controllers 18 are connected with the information processing apparatus 12 through wires or wirelessly.

The controller 16 is a typical game controller that is expected to be operated by a user who is gripping the controller 16 which is in a particular posture. On the other hand, the controllers 18 are adaptive controllers that are expected to be used by users in various states such as humans with physical disabilities. In the example in FIG. 1, users input operation by using the three controllers (the controller 16, the controller 18*a*, and the controller 18*b*) in parallel.

The display apparatus 14 has a display that outputs images and a speaker that outputs sounds. The display apparatus 14 may be a television or may be a computer display. The display apparatus 14 is connected with the information processing apparatus 12 through a wire or wirelessly. In response to acceptance of operation information provided from the controller 16 and the controllers 18, the information processing apparatus 12 causes the operation information to be reflected in processes of system software or application software, causes images related to processing results to be displayed on the display apparatus 14, and causes sounds related to processing results to be output from the speaker of the display apparatus 14.

Figure 2:
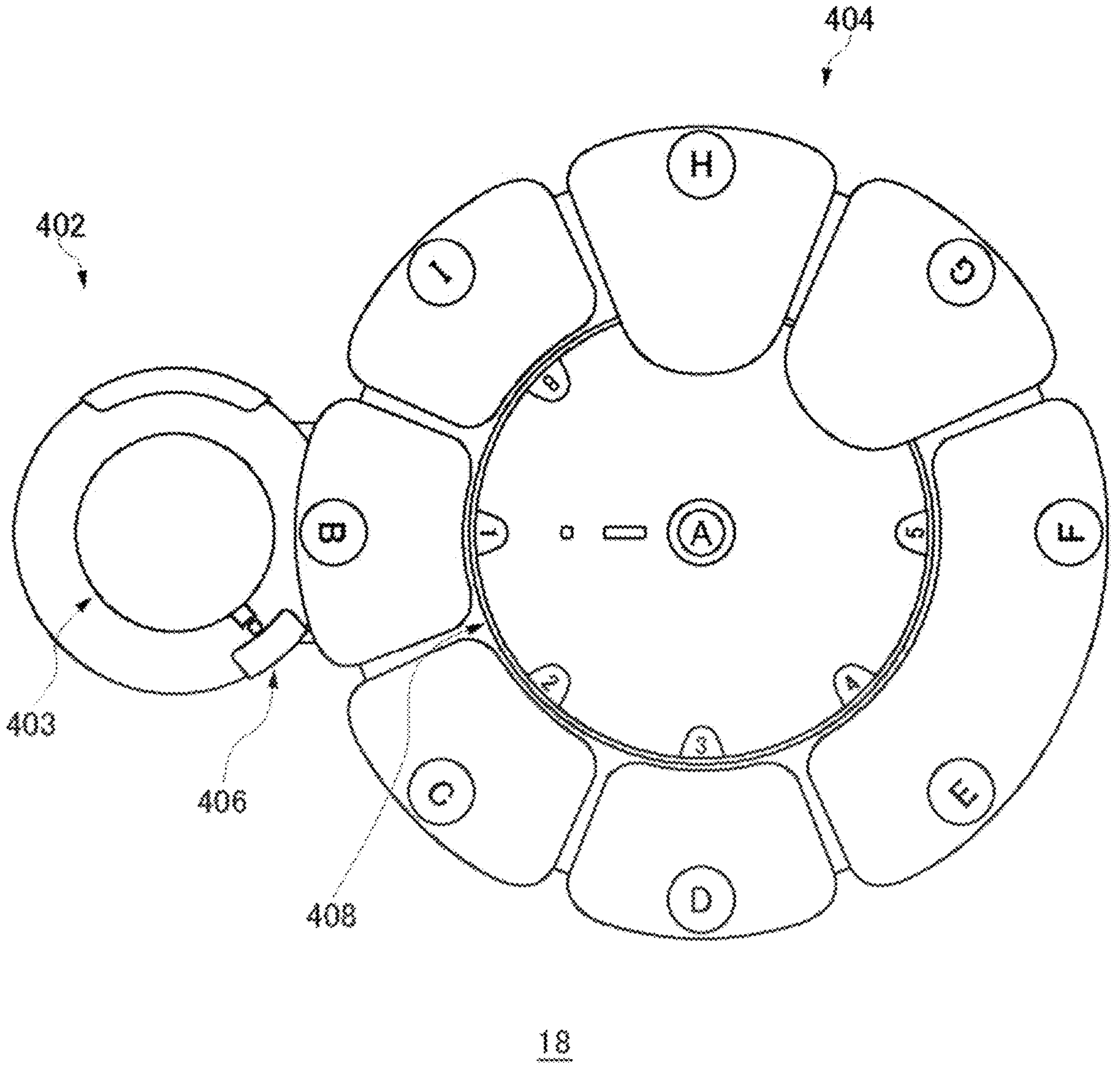
FIG. 2 is a figure depicting the top surface of a controller.

FIG. 2 is a figure depicting the top surface of a controller 18. The controller 18 includes an analog stick section 402 as a first operation member and a button section 404 as a second operation member. The button section 404 can also be said to be the body of the controller 18. Both the analog stick section 402 and the button section 404 have circular outer edges. The analog stick section 402 is arranged to protrude from the outer edge of the button section 404, and, stated differently, is connected with the button section 404 in such a manner as to protrude from the outer edge of the button section 404. The analog stick section 402 is arranged in such a manner as not to overlap the button section 404 in a case where the controller 18 is seen in a plan view. Note that the shape of the button section 404 may be a shape other than a circular shape, and it is sufficient if the button section 404 has a shape which is symmetric in the up-down direction and/or left-right direction. For example, the shape of the button section 404 may be rectangular or may be elliptical.

Note that a connecting section between the analog stick section 402 and the button section 404 includes an expandable/shrinkable member. In a case where the expandable/shrinkable member shrunk most, the analog stick section 402 and the button section 404 approach each other such that the outer edge of the analog stick section 402 and the outer edge of the button section 404 contact each other. In contrast, as the expandable/shrinkable member expands, the analog stick section 402 and the button section 404 get far from each other. A user sets the expandable/shrinkable member such that the analog stick section 402 and the button section 404 are at a desired distance.

The analog stick section 402 includes, at its middle, an analog stick 403 as an analog input device. The analog stick 403 is also called a control stick, a thumb stick, or a joystick, and is used for inputting a tilt direction and amount. The tilt amount can also be said to be a tilt angle of the analog stick 403. The analog stick 403 functions also as a press button that sinks downward when the user presses it and that returns to the original position when the user releases her/his hand.

The analog stick section 402 includes a profile button 406. The profile button 406 is an operation member for switching setting information (profiles described later) to be applied to the controller 18.

The button section 404 includes nine buttons in total including a center button arranged at the middle and a button 1 to a button 8 arranged to surround the center button. Any functions can be assigned to these nine buttons. In the example in FIG. 2, a function A (e.g., a determination function) is assigned to the center button, a function B (e.g., a cancellation function) is assigned to the button 2, and a function C (e.g., an option function) is assigned to the button 3. Functions that can be assigned to the button 1 to the button 8 include functions of direction keys for direction input (e.g., four up, down, left, and right direction keys). Hereinbelow, a button to which the function A is assigned, a button to which the function B is assigned, a button to which the function C is assigned, . . . of the button 1 to the button 8 are also called A button, B button, C button, . . . , respectively. The analog stick 403, the center button, and the button 1 to the button 8 are used for operation of system software or application software executed on the information processing apparatus 12.

The button section 404 further includes a circular light-emitting section 408 surrounding the center button. The light-emitting section 408 may include a light emitting diode (LED).

Each controller 18 according to the embodiment (hereinafter, the following similarly applies also to the controller 16) saves, on a non-volatile memory, setting information customized by a user and related to operation on the controller 18 (hereinafter, also called "profile information" or simply a "profile"). The profile information includes setting information related to behaviors of the controller 18. The controller 18 can store multiple pieces of profile information, and can switch profile information to be applied according to user operation.

The profile information may include setting values or the like that are preset regarding operation on the controller 18. In addition, the profile information may include setting information related to generation of operation information to be input to the information processing apparatus 12 on the basis of input operation on the controller 18. In addition, the profile information may include information to be referred to when an analog value detected according to input of operation on the controller 18 is converted into a digital value.

The profile information according to the embodiment includes an ID or a name of a profile, postural information regarding the controller 18, button assignment information, and sensitivity-related information regarding the analog stick 403. The postural information regarding the controller 18 is information representing a positional relation between the analog stick section 402 and the button section 404. The button assignment information is information representing various types of actions, commands, or functions assigned to the respective buttons of the controller 18 by the user. Stated differently, the button assignment information is information representing an assignment status of various types of actions, commands or functions assigned to the respective buttons.

The sensitivity-related information regarding the analog stick 403 includes information representing a setting value related to the sensitivity of the analog stick 403. The sensitivity of the analog stick 403 defines a magnitude of operation recognized by the information processing apparatus 12 in relation to a magnitude (e.g., a tilt amount or a pivot amount) of operation actually input to the analog stick 403 by the user. The magnitude of operation recognized by the information processing apparatus 12 can also be said to be a magnitude of operation input to an application being executed on the information processing apparatus 12. The sensitivity setting value may be a ratio between an amount of operation actually input to the analog stick 403 and an amount of operation recognized by the information processing apparatus 12.

In addition, the sensitivity-related information regarding the analog stick 403 includes deadzone information regarding the analog stick 403, and, for example, includes setting values related to a deadzone. The deadzone can also be said to be an insensitive zone, and is an area where operation input to the analog stick 403 is not accepted. Stated differently, the deadzone is an area where operation input to the analog stick 403 is ignored. The deadzone setting values may be value ranges of the tilt amount and the pivot amount corresponding to the deadzone. As described above, the profile information according to the embodiment includes setting information regarding the analog stick 403 of the controller 18.

An overview of the information processing system 10 according to the embodiment is explained. The information processing system 10 has the following five features.

(Feature 1) Determination of Postures of the Controllers:

Each controller 18 can be used at any posture. A posture of the controller 18 can also be said to be a positional relation between the analog stick section 402 and the button section 404. In the embodiment, a posture of the controller 18 at the time of its use is selected by a user from multiple patterns of the posture of the controller 18. As a result, the user can cause the information processing apparatus 12 to recognize the posture of the controller 18, and can use the controller 18 in the posture which is convenient for her/himself. Information that is regarding the posture of the controller 18 and that is selected by the user is retained in the controller 18 as the profile information.

(Feature 2) Button Mapping for Operation in an Edit Mode:

It is necessary to allow a user to assign, to freely-selected buttons on each controller 18, functions that she/he desires to assign. For example, the determination function and the cancellation function, which are necessary at the time of profile edit (e.g., at the time of assignment of functions to buttons), also need to be included in functions that can be assigned. In addition, a posture of the controller 18 of an edit-target profile and a posture of the controller 18 of a currently-enabled profile are different in some cases. In this case, it is not easy to edit the profile. In view of this, in the embodiment, button mapping fixed as button mapping for operation in the edit mode is provided. As a result, while the user is allowed to assign, to freely-selected buttons, functions that she/he desires to assign, it is possible to make operation for the function assignment easy.

(Feature 3) Alert at the Time when Essential Functions are not Assigned:

In a case where a user assigns, to freely-selected buttons on each controller 18, functions that she/he desires to assign, there is a possibility that functions essential for operation of the system are left unassigned. In the embodiment, in a case where essential functions are left unassigned to buttons, a predetermined alert is presented to the user. In addition, the degree of freedom of assignment of functions to buttons is enhanced by allowing the user to save a profile in which essential functions are left unassigned, when desired by the user.

(Feature 4) Notification of a Toggle Mode:

Long-pressing operation of keeping pressing a button of a controller with a certain force is necessary in operation of an application in some cases. There are also some users who have difficulty performing long-pressing operation of a button. In the embodiment, each button of each controller 18 can be set to the toggle mode. The toggle mode is an operation mode in which a button of the controller 18 operates like a toggle button, and performing short-time pressing operation once triggers continuation of an input state or termination of the continuation of the input state. In addition, in a case where a certain button has been set to the toggle mode and the input state is continuing, button information regarding this is displayed on a screen. As a result, long-pressing operation becomes possible by performing button-pressing operation once, and also continuation of the input state of the button can be visualized.

(Feature 5) Expression of the Analog-Stick Sensitivity Adjustment Status by a Sound:

In related art, the levels of sensitivity have been expressed visually by use of charts, it is demanded to meet more diverse needs of users. In the embodiment, changes of the pitch of sounds are included as means for expressing the level of sensitivity of an analog stick. By including auditory information in feedback of the sensitivity adjustment status, changes of the sensitivity can be presented to users in a more easy-to-understand manner. In addition, feedback which is inclusive for various users can be realized.

Figure 3:
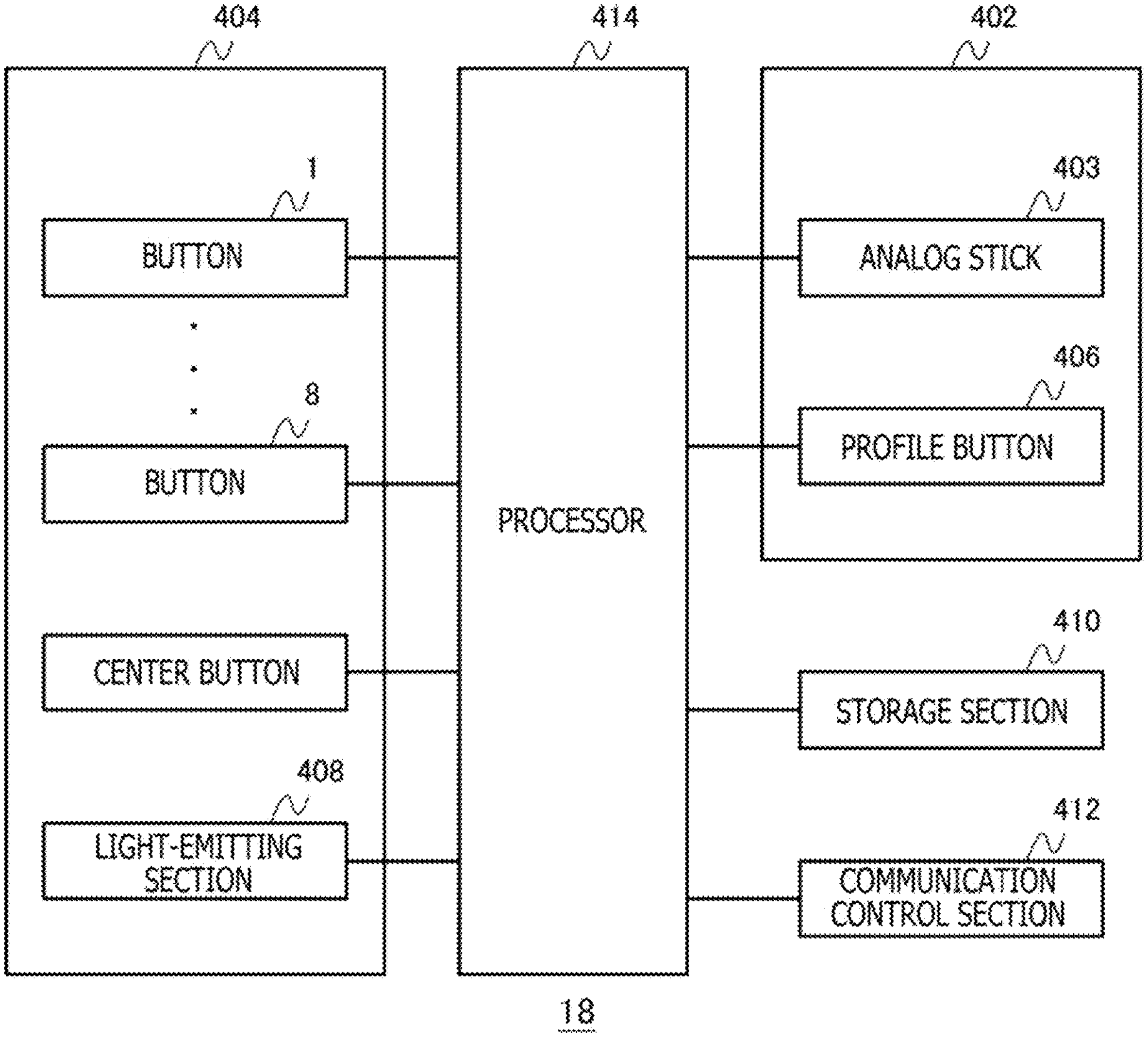
FIG. 3 is a diagram depicting a hardware configuration related to an embodiment of controllers.

FIG. 3 depicts a hardware configuration related to the embodiment of the controllers 18. In addition to the hardware depicted in FIG. 2, each controller 18 includes a storage section 410, a communication control section 412, and a processor 414. The processor 414 executes various types of data processing, and also controls operation of various types of hardware. The processor 414 may include a central processing unit (CPU), a memory, or a system on a chip (SoC). The storage section 410 stores data to be referred to or updated by the processor 414. The communication control section 412 controls communication with an external apparatus. Whereas the communication control section 412 wirelessly communicates with the information processing apparatus 12 in the embodiment, the communication control section 412 may communicate with the information processing apparatus 12 through a wire, as a modification example.

Figure 4:
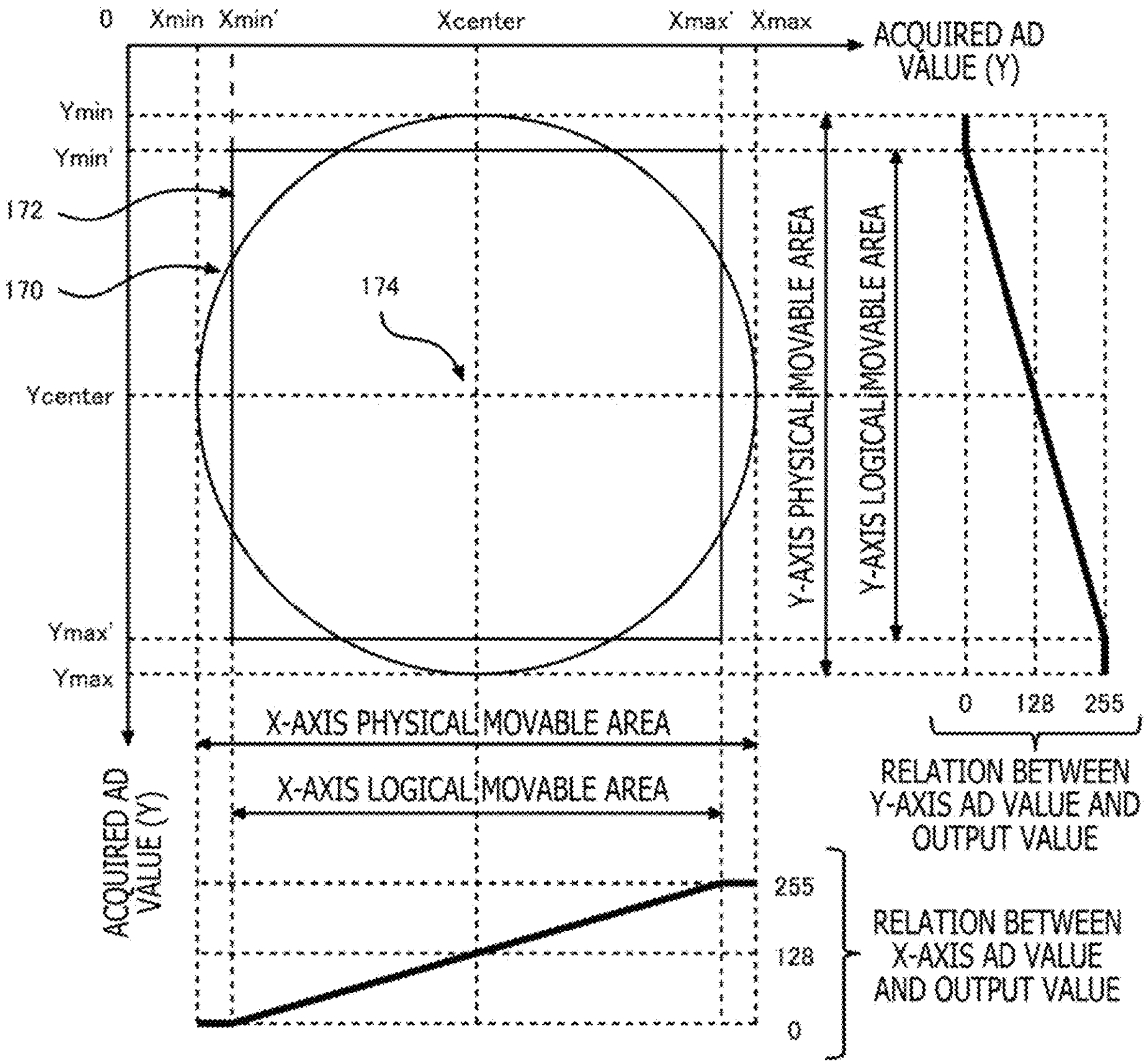
FIG. 4 is a figure depicting the relation between operation and output values of an analog stick.

In the embodiment, input operation on the analog stick section 402 (the analog stick 403) by a user is detected as information on a two-dimensional plane. FIG. 4 depicts the relation between operation and output values of the analog stick 403. A physical movable area 170 represented by a solid-line circle represents an area where the analog stick 403 can actually move. A return position 174 can also be said to be a center return position, and is the position of the analog stick 403 when fingers are not touching the analog stick 403 (i.e., at the time of non-operation of the analog stick 403). Minimum values ($X_{min}$ and $Y_{min}$) and maximum values ($X_{max}$ and $Y_{max}$) Of AD values in the physical movable area 170 and, further, AD values ($X_{center}$ and $Y_{center}$) at the return position 174 are measured at the time of manufacture of the controller 18.

Further, a predetermined rate (4% in the embodiment) of the distances from the return position 174 to AD maximum values ($X_{max}$ and $Y_{max}$) based on the physical movable area 170 is set as an offset value, and positions ($X'_{max}$ and $Y'_{max}$) that are offset inward from the AD maximum values by amounts corresponding to the offset value are treated as the maximum values of output values from the controller 18. Similarly, a predetermined rate (4% in the embodiment) of the distances from the return position 174 to AD minimum values ($X_{min}$ and $Y_{min}$) based on the physical movable area 170 is set as an offset value, and positions ($X'_{min}$ and $Y'_{min}$) that are offset inward from the AD minimum values by amounts corresponding to the offset value are treated as the minimum values of output values from the controller 18.

The area defined by ($X'_{max}$ and $Y'_{max}$) and ($X'_{min}$ and $Y'_{min}$) is treated as a logical movable area 172. As mentioned already, user operation on the analog stick 403 is detected as values on the two-dimensional plane including an X axis and a Y axis, and the controller 18 outputs, to the information processing apparatus 12, operation information related to the detected values. The output values from the controller 18 (the output values represented by the operation information) include an output value in an X-axis direction and an output value in a Y-axis direction, and the respective output values are normalized within the range of 0 to 255. The normalized output values are values that change within ranges corresponding to the logical movable area 172.

As represented by a graph on the lower side of FIG. 4, an output value in the X-axis direction is determined in the following manner according to an X-axis AD value in the physical movable area 170.

(1) In a case where the AD value is equal to or smaller than $X'_{min}$, the output value is determined as 0.

(2) In a case where the AD value is equal to or greater than $X'_{min}$ and equal to or smaller than $X_{center}$, the output value is determined by linearly interpolating the AD value such that the output value becomes equal to or greater than 0 and equal to or smaller than 128.

(3) In a case where the AD value is equal to or greater than $X_{center}$ and equal to or smaller than $X'_{max}$, the output value is determined by linearly interpolating the AD value such that the output value becomes equal to or greater than 128 and equal to or smaller than 255.

(4) In a case where the AD value is equal to or greater than $X'_{max}$, the output value is determined as 255. Similarly, as represented by a graph on the right side of FIG. 4, an output value in the Y-axis direction is determined in the following manner according to a Y-axis AD value in the physical movable area 170.

(1) In a case where the AD value is equal to or smaller than $Y'_{min}$, the output value is determined as 0.

(2) In a case where the AD value is equal to or greater than $Y'_{min}$ and equal to or smaller than $Y_{center}$, the output value is determined by linearly interpolating the AD value such that the output value becomes equal to or greater than 0 and equal to or smaller than 128.

(3) In a case where the AD value is equal to or greater than $Y_{center}$ and equal to or smaller than Y' max, the output value is determined by linearly interpolating the AD value such that the output value becomes equal to or greater than 128 and equal to or smaller than 255.

(4) In a case where the AD value is equal to or greater than $Y'_{max}$, the output value is determined as 255.

Figure 5:
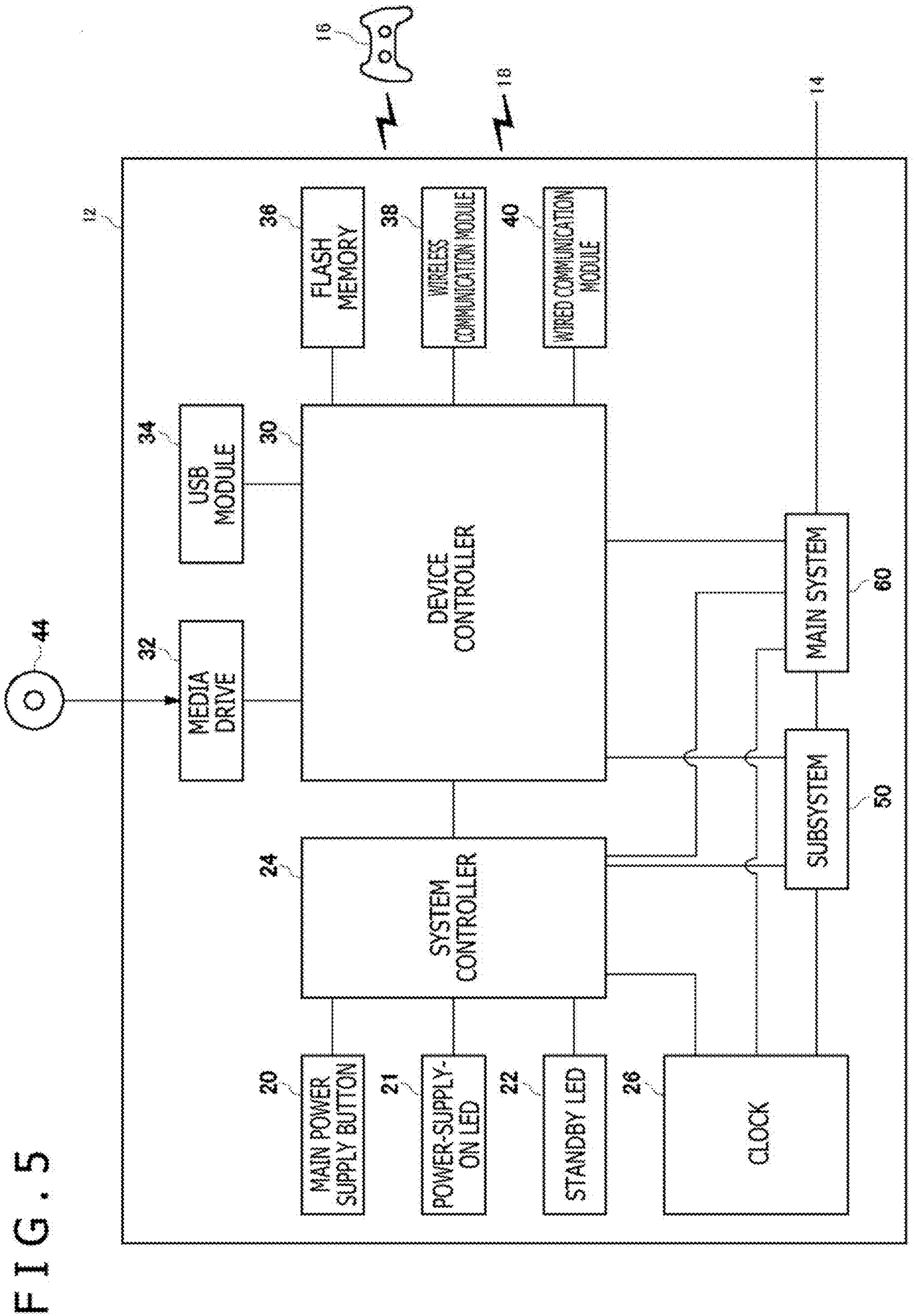
FIG. 5 is a diagram depicting a hardware configuration related to an embodiment of an information processing apparatus.

FIG. 5 depicts a hardware configuration related to an embodiment of the information processing apparatus 12. The information processing apparatus 12 includes a main power supply button 20, a power-supply-ON LED 21, a standby LED 22, a system controller 24, a clock 26, a device controller 30, a media drive 32, a universal serial bus (USB) module 34, a flash memory 36, a wireless communication module 38, a wired communication module 40, a subsystem 50, and a main system 60. The subsystem 50 and the main system 60 can collectively be referred to as a processor.

The main system 60 includes a main CPU, a memory and a memory controller which are a main storage apparatus, a graphics processing unit (GPU), and the like. The GPU is mainly used for computation processes of game programs. These functions may be configured as an SoC, and formed on one chip. The main CPU has a function to activate an OS and execute applications installed on a storage section (e.g., the flash memory 36 or an auxiliary storage apparatus which is not depicted), in an environment provided by the OS. In addition, the main system 60 has a function to control contents displayed by the display apparatus 14.

The subsystem 50 includes a sub CPU, a memory and a memory controller which are a main storage apparatus, and the like, but does not include a GPU. The number of circuit gates of the sub CPU is smaller than the number of circuit gates of the main CPU, and the operation electric power consumption of the sub CPU is smaller than the operation electric power consumption of the main CPU. The sub CPU is configured to operate while the main CPU is in the standby state, and processing functions of the sub CPU are restricted in order to keep the electric power consumption low. Note that the sub CPU and the memory may be formed on separate chips.

The main power supply button 20 is an input section on which operation input by a user is performed, is provided on the front surface of a housing of the information processing apparatus 12, and is operated for turning on or off the power supply to the main system 60 of the information processing apparatus 12. Hereinbelow, that the main power supply is in the ON state means that the main system 60 is in the active state, and that the main power supply is in the OFF state means that the main system 60 is in the standby state. The power-supply-ON LED 21 is put on when the main power supply button 20 is turned on, and the standby LED 22 is put on when the main power supply button 20 is turned off.

The system controller 24 detects pressing of the main power supply button 20 by a user. When the main power supply button 20 is pressed while the main power supply is in the OFF state, the system controller 24 acquires the pressing operation as an "ON instruction." In contrast, when the main power supply button 20 is pressed while the main power supply is in the ON state, the system controller 24 acquires the pressing operation as an "OFF instruction." The system controller 24 may acquire power-supply ON/OFF instructions similar to those described above from operation input from the controller 16 or the controller 18.

The main CPU has a function to execute game programs installed on a predetermined storage section or a read only memory (ROM) medium 44. In contrast, the sub CPU does not have such a function. However, the sub CPU has a function to access a storage section and a function to transmit and receive data to and from an external apparatus. The sub CPU is configured to have only such restricted processing functions, and accordingly can operate with electric power consumption which is low as compared with that of the main CPU. These functions of the sub CPU are executed when the main CPU is in the standby state.

The clock 26 is a real time clock. The clock 26 generates current date/time information, and supplies the current date/time information to the system controller 24, the subsystem 50, and the main system 60.

The device controller 30 is configured as a large-scale integrated circuit (LSI) like a southbridge that executes information exchange between devices. As depicted in the figure, the device controller 30 is connected with devices such as the system controller 24, the media drive 32, the USB module 34, the flash memory 36, the wireless communication module 38, the wired communication module 40, the subsystem 50, and the main system 60. The device controller 30 absorbs the differences of electrical characteristics or data transfer speed between the devices, and controls a data transfer timing.

The media drive 32 is a drive apparatus to which the ROM medium 44 on which application software such as games and license information are recorded is attached. The media drive 32 drives the ROM medium 44, and reads out programs, data, and the like from the ROM medium 44. The ROM medium 44 is a read-only recording medium such as an optical disc, a magneto-optical disc, or a Blue-ray disc.

The USB module 34 is a module for connection with external equipment through a USB cable. The flash memory 36 is an auxiliary storage apparatus included in an internal storage. The wireless communication module 38 wirelessly communicates with, for example, the controller 16 and the controllers 18 by a communication protocol such as the Bluetooth (trademark or registered trademark) protocol or the Institute of Electrical and Electronics Engineers (IEEE) 802.11 protocol. The wired communication module 40 communicates with external equipment through a wire, and, for example, is connected with the Internet, a server, or the like via an access point which is not depicted.

Figure 6:
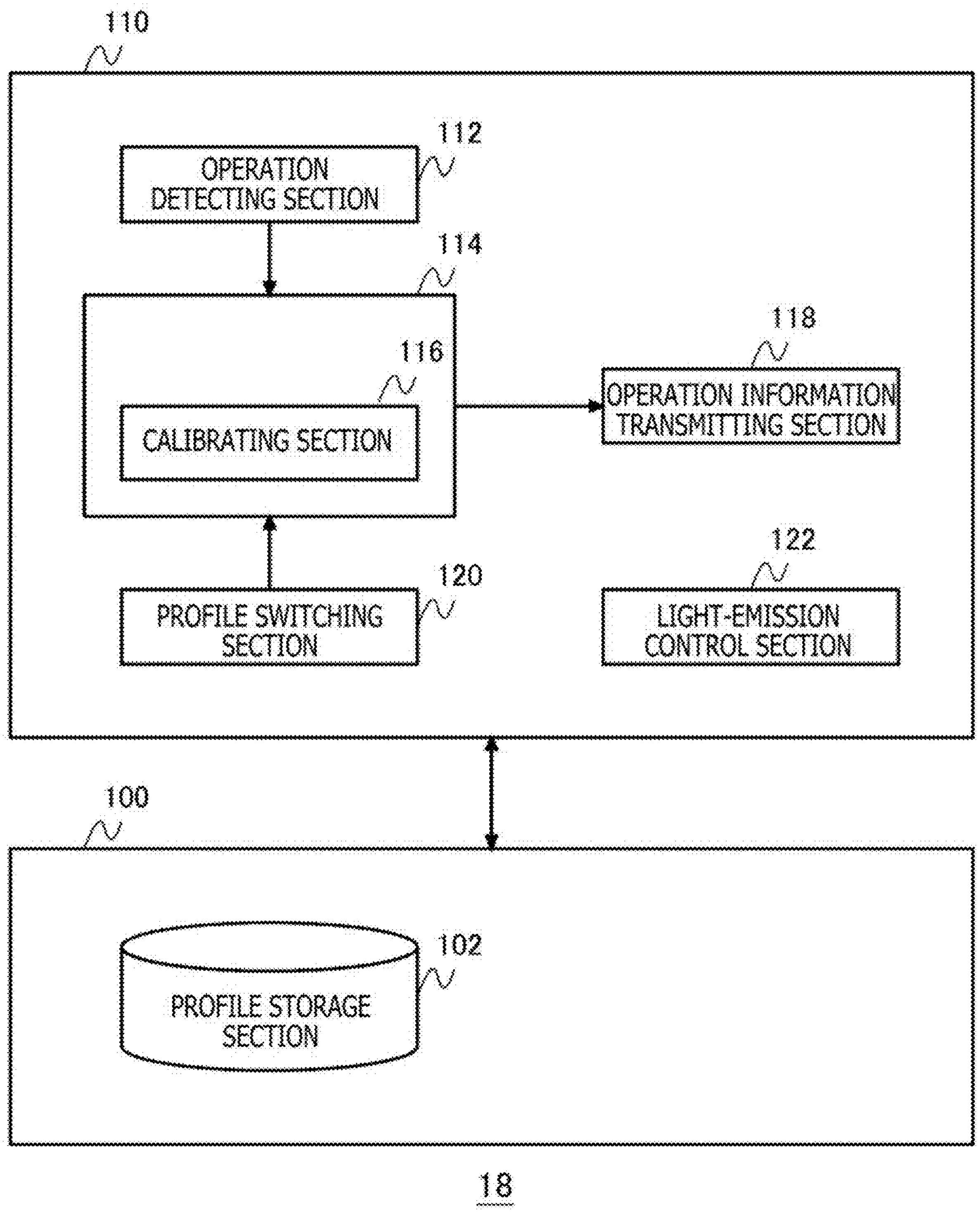
FIG. 6 is a block diagram depicting functional blocks of the controller.

FIG. 6 is a block diagram depicting functional blocks of the controller 18. Each block depicted in block diagrams in the present specification can be realized by an element, an electronic circuit, or a machine apparatus such as a processor, a CPU, or a memory of a computer in terms of hardware, and can be realized by a computer program or the like loaded onto a memory in terms of software. Here, functional blocks realized by cooperation therebetween are drawn. Accordingly, it is understood by those skilled in the art that these functional blocks can be realized in various forms by combinations of hardware and software.

The controller 18 includes a storage section 100 and a processing section 110. The storage section 100 corresponds to the storage section 410 in FIG. 3, and stores data to be referred to or updated by the processing section 110. The storage section 100 includes a profile storage section 102.

The profile storage section 102 includes a non-volatile memory that stores multiple pieces of profile information. The profile storage section 102 stores respective pieces of the multiple pieces of profile information in association with mutually different slots. For example, the profile storage section 102 may store up to four pieces of profile information in association with up to four slots. The profile information according to the embodiment includes information regarding a posture of the controller 18 selected by a user, and, stated differently, includes information regarding a positional relation between the analog stick section 402 and the button section 404.

At the time of factory shipment of a controller 6, a default profile is saved on the profile storage section 102 in association with one slot. The default profile is profile information in which assignment of a function to each button, the sensitivity, the deadzone, and the like are set to default values. The default profile cannot be edited or deleted by a user. On other slots, new profile information customized by a user can be saved, or existing profile information can be edited and deleted.

The processing section 110 includes an operation detecting section 112, an operation information generating section 114, an operation information transmitting section 118, a profile switching section 120, and a light-emission control section 122. The operation information generating section 114 includes a calibrating section 116. A computer program (e.g., firmware) that implements these multiple functions may be stored on a storage section 92 of the controller 6. A processor 96 of the controller 6 may realize these multiple functions by reading out the computer program onto a main memory and executing the computer program thereon.

On the basis of input operation on the controller 18 by a user or an instruction from the information processing apparatus 12, the profile switching section 120 sets one of multiple pieces of profile information stored on the profile storage section 102 as profile information that should be applied to operation input to the controller 18 (hereinafter, also called an "applied profile"). Stated differently, on the basis of input operation on the controller 18 by a user or an instruction from the information processing apparatus 12, the profile switching section 120 switches the applied profile of the controller 18.

The controller 18 according to the embodiment includes a profile edit mode as an operation mode. Processes executed in the profile edit mode include a process of assisting a user to assign, to a freely-selected button of the controller 18, a function that she/he desires to assign. As an applying section, the profile switching section 120 applies setting information in which edit-related functions which are enabled in the profile edit mode are assigned to buttons at predetermined positions among multiple buttons of the controller 18, and causes the controller 18 to operate according to the setting information. Specifically, when a transition to the profile edit mode is made, the profile switching section 120 switches to a profile-edit-mode profile in which the edit-related functions are assigned to the buttons at the predetermined positions.

In the embodiment, as the profile-edit-mode profile, the default profile is applied to button mapping (i.e., assignment of a function to each button), the sensitivity of the analog stick, and the deadzone. On the other hand, as the profile-edit-mode profile, a profile being edited is applied to the orientation of the controller 18 (i.e., the positional relation between the analog stick section 402 and the button section 404), and, stated differently, a profile at the time of the transition to the profile edit mode is applied thereto.

The operation detecting section 112 detects user operation input to the controller 18. For example, user operation includes operation of pressing the center button or the buttons 1 to 8 and operation of tilting the analog stick 403. The operation detecting section 112 detects an analog value that accompanies operation on the analog stick 403, performs analog-to-digital conversion on the analog value, and passes a digital value obtained after the conversion to the operation information generating section 114.

On the basis of the applied profile and user operation that has been input to the controller 18 and detected by the operation detecting section 112, the operation information generating section 114 generates user operation information to be transmitted from the controller 18 to the information processing apparatus 12. The operation information transmitting section 118 transmits the operation information generated by the operation information generating section 114 to the information processing apparatus 12.

For example, the operation information generating section 114 generates operation information including a value obtained by calibrating, on the basis of the applied profile (e.g., the positional relation between the analog stick section 402 and the button section 404), a value based on user operation input to the analog stick 403. In addition, in a case where pressing of a button is detected, the operation information generating section 114 generates operation information representing information regarding a function assigned to the button in the applied profile. The functional information may be information representing a function such as determination or cancellation itself, or may be information representing a type of button (e.g., A button, B button, etc.) associated with a particular function.

The calibrating section 116 calibrates the value based on the user operation input to the analog stick 403, on the basis of the applied profile. Specifically, the calibrating section 116 derives a value to be input to the information processing apparatus 12 (stated differently, a value that should be set in operation information), by calibrating, on the basis of the positional relation between the analog stick section 402 and the button section 404, the value based on the user operation input to the analog stick 403.

Note that, on the basis of the sensitivity and the deadzone values of the analog stick 403 represented by the applied profile, the calibrating section 116 further calibrates the value based on the user operation input to the analog stick 403. Specifically, on the basis of the sensitivity and the deadzone values of the analog stick 403, the calibrating section 116 further calibrates the calibrated value derived on the basis of the positional relation between the analog stick section 402 and the button section 404, and derives a value to be input to the information processing apparatus 12. A known technology may be used for the calibration method based on the sensitivity and the deadzone values.

The light-emission control section 122 controls the light-emitting section 408 of the button section 404 to put on and put out. In the profile edit mode, the light-emission control section 122 causes the light-emitting section 408 to emit light in a predetermined manner. For example, the light-emission control section 122 controls the light-emitting section 408 to emit yellow light.

Figure 7:
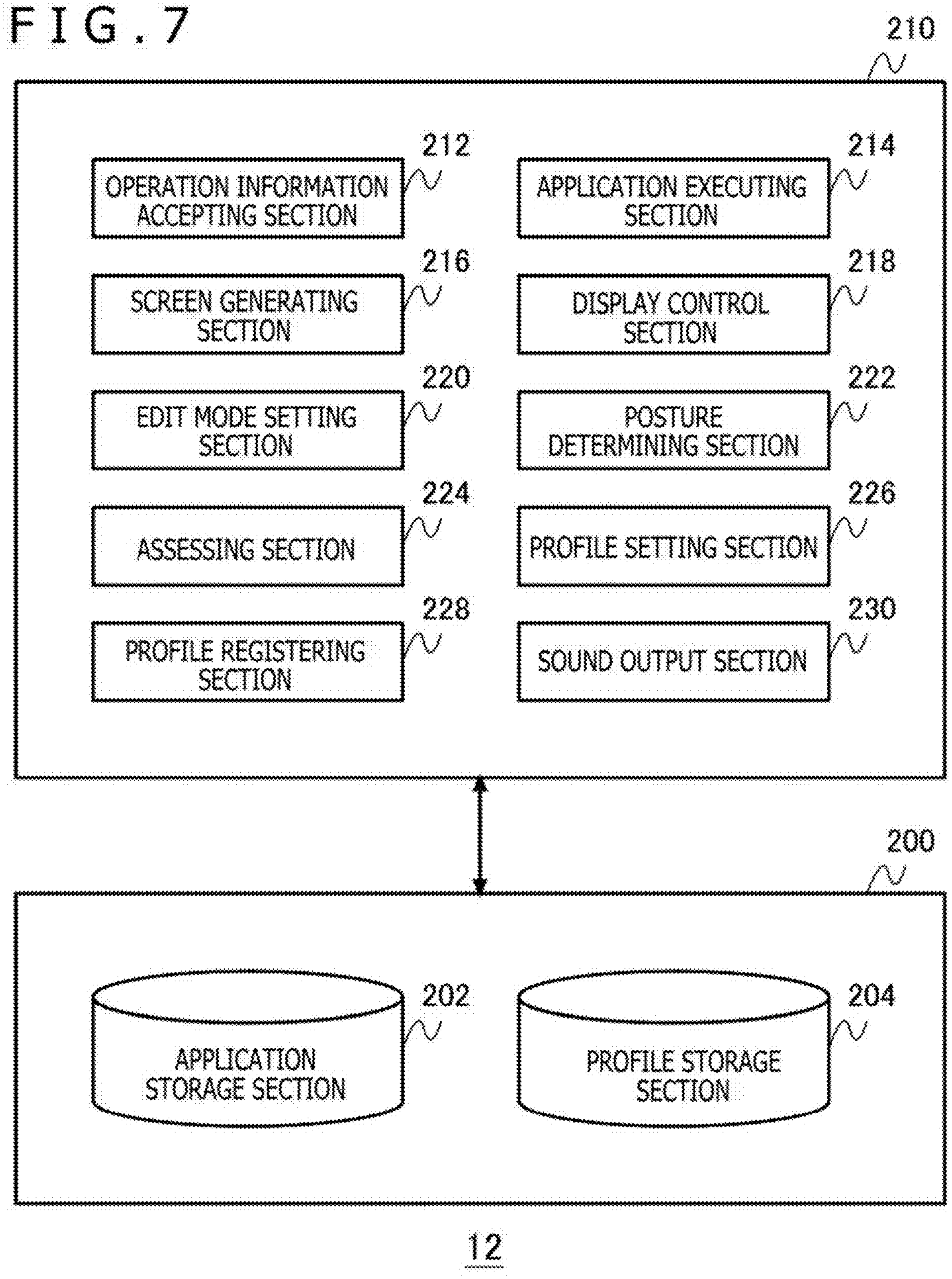
FIG. 7 is a block diagram depicting functional blocks of the information processing apparatus.

FIG. 7 is a block diagram depicting functional blocks of the information processing apparatus 12. The information processing apparatus 12 includes a storage section 200 and a processing section 210. The processing section 210 executes various types of information processing. The processing section 210 is realized by a processor of the information processing apparatus 12, and, for example, may be realized by the main system 60 depicted in FIG. 5. The storage section 200 stores data to be referred to or updated by the processing section 210. The storage section 200 can include the flash memory 36 or the ROM medium 44 depicted in FIG. 5.

The storage section 200 includes an application storage section 202 and a profile storage section 204. The application storage section 202 stores data of applications that can be executed on the information processing apparatus 12. Unless otherwise noted particularly, "applications" in the explanation of the specification include system software that performs basic management and control of the information processing apparatus 12, in addition to application software such as game programs.

The profile storage section 204 stores profile information of each controller of multiple controllers (the controller 16, the controller 18*a*, the controller 18*b*) of which the controller has given a notification. In addition, the profile storage section 204 stores information which is regarding the current applied profile of each controller and of which the controller has given a notification. For example, the profile storage section 204 stores information as to which profile corresponding to any slot of slots 1 to 4 is the applied profile. Note that the profile storage section 204 can store multiple pieces of profile information (five or more pieces of profile information in the embodiment) for each controller. A user can store the five or more pieces of profile information on the information processing apparatus 12 in advance, and save, on the controller 18, profile information chosen from them.

The processing section 210 includes an operation information accepting section 212, an application executing section 214, a screen generating section 216, a display control section 218, an edit mode setting section 220, a posture determining section 222, an assessing section 224, a profile setting section 226, a profile registering section 228, and a sound output section 230. A computer program (e.g., system software or application software) that implements these multiple functions may be stored on the storage section 200. The processor of the information processing apparatus 12 may realize these multiple functions by reading out the computer program onto a main memory and executing the computer program thereon.

The operation information accepting section 212 accepts information that is transmitted from the controller 18 connected to the information processing apparatus 12 and that is regarding user operation on the controller 18.

The application executing section 214 executes applications (as mentioned already, including application software and system software) stored on the application storage section 202. For example, the application executing section 214 executes applications according to information regarding user operation on the controller 18, and passes information regarding execution results of the applications to the screen generating section 216. The screen generating section 216 generates data of a screen representing the execution results of the applications executed by the application executing section 214. For example, in a case where the information processing apparatus 12 and the controller 18 are in the profile edit mode, the screen generating section 216 generates data of an edit screen including content used to assist editing of a profile. The edit screen includes an orientation screen 300, a button assignment customization screen 310, and a sensitivity adjustment screen 320 described later.

The display control section 218 controls the displaying of information on the display apparatus 14. The display control section 218 causes the display apparatus 14 to display various types of screens by outputting data of screens generated by the screen generating section 216 to the display apparatus 14. The combination of the screen generating section 216 and the display control section 218 can also be called a screen display section. Hereinbelow, the process of causing a screen to be displayed is also explained simply by using the expression that "the screen generating section 216 displays a screen."

As a transition instructing section, the edit mode setting section 220 causes the information processing apparatus 12 and the controller 18 to transition to the profile edit mode according to user operation.

As a determining section, the posture determining section 222 determines the posture of the controller 18 according to input operation on the controller 18 in the profile edit mode. Specifically, the posture determining section 222 determines the positional relation between the analog stick section 402 and the button section 404. The profile setting section 226 sets profile information including information regarding the positional relation between the analog stick section 402 and the button section 404. As a setting information registering section, the profile registering section 228 transmits, to the controller 18, the profile information set by the profile setting section 226, and causes the controller 18 to store the profile information. The profile information further includes information representing a function assigned to each of multiple buttons, and is displayed on a profile edit screen at the time of the profile edit mode.

In a case where termination operation on the edit screen is input in the profile edit mode, the assessing section 224 assesses whether or not preset essential functions are assigned to any ones of the multiple buttons. The essential functions are functions which are essential for operation of system software and/or operation of application software. The essential functions may include at least one of the determination function and the cancellation function. The assessing section 224 may assess whether or not a particular type of button (e.g., A button, B button) as an essential function is assigned.

In a case where termination operation on the edit screen is input in the profile edit mode and the essential functions are assigned to none of the multiple buttons, the screen generating section 216 generates predetermined alert information. The display control section 218 causes the predetermined alert information to be displayed on the edit screen. In a case where predetermined operation is input after the alert information is displayed, the display control section 218 terminates the displaying of the edit screen.

In addition, in the profile edit mode, the screen generating section 216 generates a profile edit screen such that a freely-selected button of the controller 18 can be set to a special mode in which an input state thereof continues (hereinafter, also called a "toggle mode"). On a screen after termination of the edit mode, the screen generating section 216 causes information regarding continuation of the input state of the button set to the toggle mode to be displayed. The screen after the termination of the edit mode includes both a screen related to execution of system software on the information processing apparatus 12 and a screen related to execution of application software on the information processing apparatus 12.

The sound output section 230 transmits sound data to the display apparatus 14, and causes the speaker of the display apparatus 14 to output a sound. In a case where predetermined operation is input while an adjustment screen (the sensitivity adjustment screen 320 described later) for adjusting the sensitivity of the analog stick 403 is displayed, the sound output section 230 causes a sound to be output in a manner according to the sensitivity adjusted on the adjustment screen. In the embodiment, as the sensitivity after adjustment on the adjustment screen increases, the sound output section 230 increases the pitch of a sound to be output along with operation input to the analog stick 403.

Figure 8:
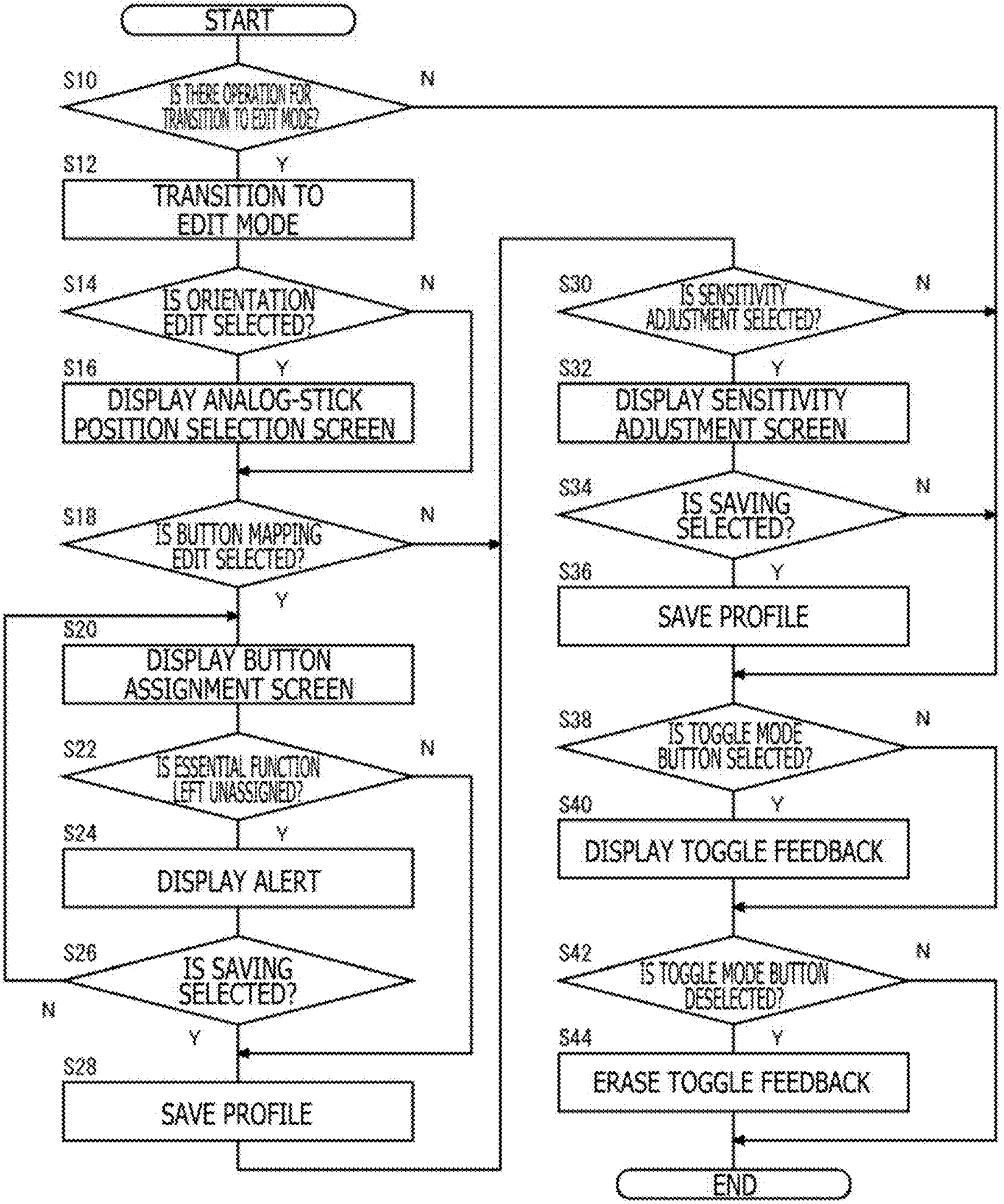
FIG. 8 is a flowchart depicting an operation of the information processing apparatus.

FIG. 8 is a flowchart depicting an operation of the information processing apparatus 12. Hereinbelow, an operation of the information processing system 10 is explained with reference to FIG. 8.

At predetermined timings, the controller 18 samples user operation on the analog stick 403, the center button, and the button 1 to the button 8 (i.e., A button, B button, etc.), and serially transmits, to the information processing apparatus 12, acquired operation information related to operation. The operation information accepting section 212 of the information processing apparatus 12 accepts information that is transmitted from the controller 18 and that is regarding user operation input to the controller 18.

If user operation which is an instruction for a transition to the profile edit mode is input while a setting screen of the information processing apparatus 12 is displayed (Y in S10), the edit mode setting section 220 of the information processing apparatus 12 causes the information processing apparatus 12 to transition to the edit mode. In addition, by transmitting, to the controller 18, control information which is an instruction for a transition to the edit mode, the edit mode setting section 220 causes the controller 18 to transition to the edit mode (S12). After the transition to the edit mode, the profile switching section 120 of the controller 18 switches the applied profile of the controller 18 to the edit-mode profile.

On an edit-mode top screen, choices for (1) orientation edit, (2) button mapping edit (button assignment), and (3) adjustment of the sensitivity and deadzone of the analog stick are displayed. If orientation is selected (Y in S14), the screen generating section 216 of the information processing apparatus 12 generates data of an orientation screen, and the display control section 218 causes the display apparatus 14 to display the orientation screen (S16).

Figure 9:
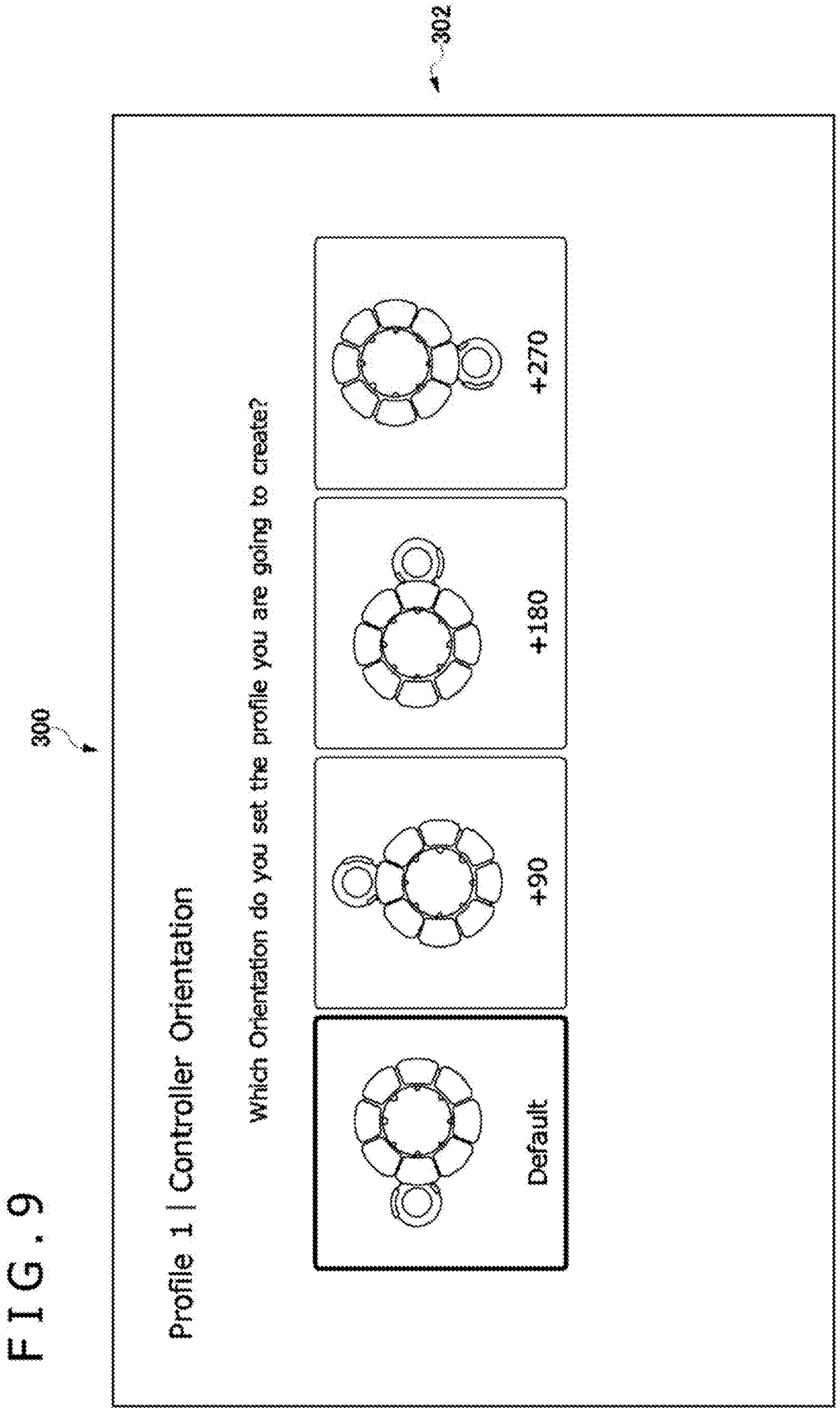
FIG. 9 is a figure depicting an example of an orientation screen.

FIG. 9 depicts an example of the orientation screen 300. The orientation screen 300 is a screen on which a posture at the time of use of the controller 18 is to be selected, and, stated differently, is a screen on which a positional relation between the analog stick section 402 and the button section 404 is to be selected. The orientation screen 300 includes a position pattern image 302.

The position pattern image 302 is an image depicting, as choices, multiple patterns of the positional relation between the analog stick section 402 and the button section 404. For example, "Default" in the position pattern image 302 in FIG. 9 is a pattern in which the analog stick section 402 is arranged to the left of the button section 404. "+90" in the position pattern image 302 in FIG. 9 is a pattern in which the analog stick section 402 is rotated 90 degrees clockwise from that in the default pattern, that is, a pattern in which the analog stick section 402 is arranged to the north of the button section 404 (the side farther from a user).

"+180" in the position pattern image 302 in FIG. 9 is a pattern in which the analog stick section 402 is rotated 180 degrees clockwise from that in the default pattern, that is, a pattern in which the analog stick section 402 is arranged to the right of the button section 404. "+270" in the position pattern image 302 in FIG. 9 is a pattern in which the analog stick section 402 is rotated 270 degrees clockwise from that in the default pattern, that is, a pattern in which the analog stick section 402 is arranged to the south of the button section 404 (the side closer to the user). The user selects a pattern that matches the posture of the controller 18 at the time of use, from the four patterns depicted in the position pattern image 302.

When user operation to select one pattern from the multiple patterns depicted in the position pattern image 302 is input, the posture determining section 222 of the information processing apparatus 12 determines the positional relation between the analog stick section 402 and the button section 404 according to the selected pattern. The posture determining section 222 determines the positional relation represented by the selected pattern (e.g., any one of default, +90, +180, and +270), as the positional relation between the analog stick section 402 and the button section 404.

On the orientation screen 300, the user operates the analog stick 403 to select a pattern that matches the posture of the controller 18, from the position pattern image 302, and presses the center button to which the determination function is assigned. When a particular pattern is selected on the orientation screen 300, the profile setting section 226 of the information processing apparatus 12 sets profile information including information regarding the posture of the controller 18 set on the orientation screen 300. The postural information regarding the controller 18 can also be said to be information representing the positional relation between the analog stick section 402 and the button section 404.

The profile registering section 228 of the information processing apparatus 12 saves the profile information set by the profile setting section 226, on the profile storage section 204 of the information processing apparatus 12. In addition, the profile registering section 228 transmits, to the controller 18, the profile information set by the profile setting section 226, and causes the profile storage section 102 of the controller 18 to store the profile information. If the orientation edit is not selected on the edit-mode top screen (N in S14), the process in S16 is skipped.

If the button mapping edit is selected on the edit-mode top screen (Y in S18), the screen generating section 216 of the information processing apparatus 12 generates data of the button assignment customization screen for performing assignment of functions to buttons. The display control section 218 causes the display apparatus 14 to display the button assignment customization screen (S20).

Figure 10:
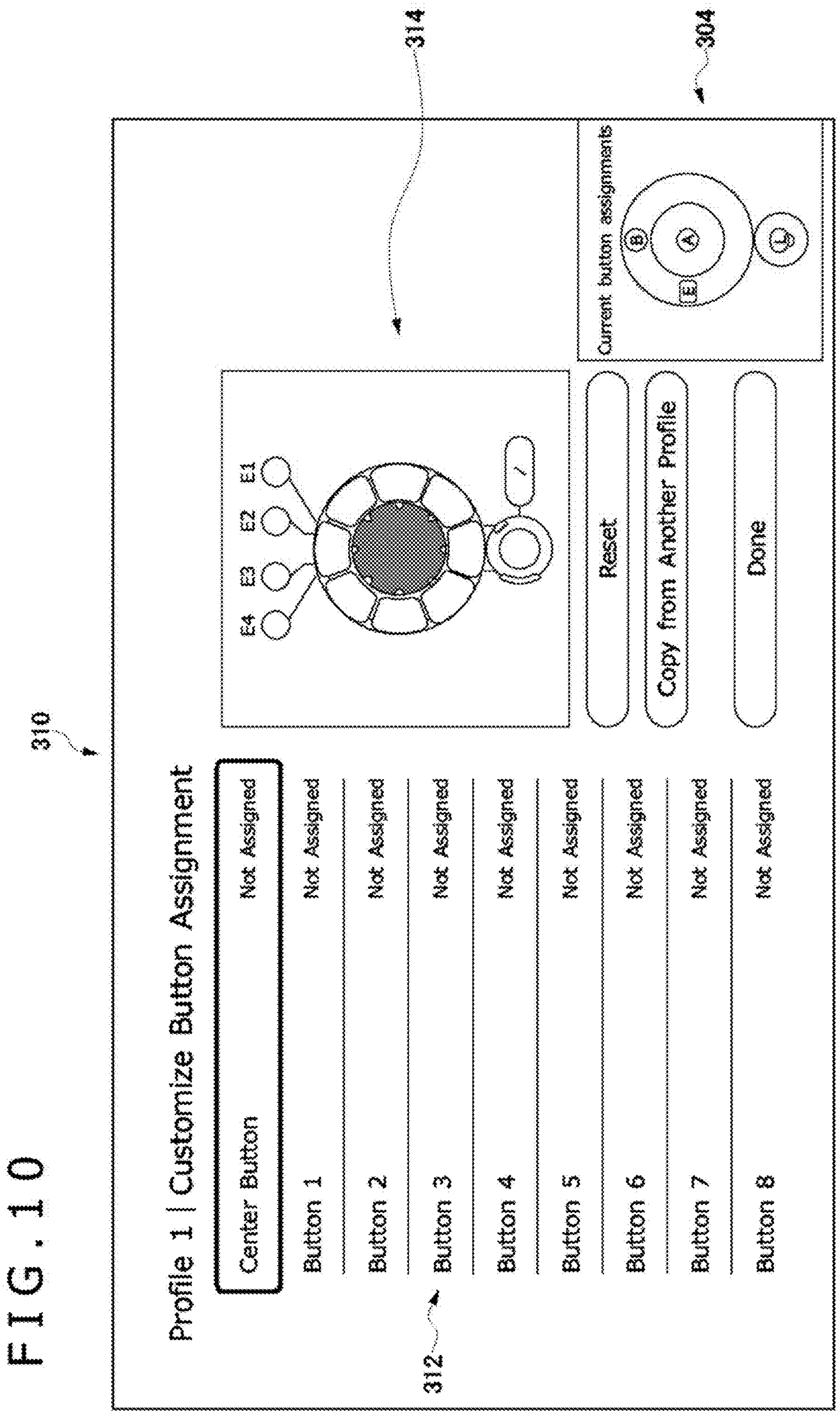
FIG. 10 is a figure depicting an example of a button assignment customization screen.

FIG. 10 depicts an example of the button assignment customization screen 310. The button assignment customization screen 310 is a screen on which, according to user operation, a function that a user desires to assign is assigned to a freely-selected button of the controller 18. The button assignment customization screen 310 includes a button list 312, a controller image 314, and current assignment information 304. The button list 312 displays a list of buttons provided on the controller 18. The button list 312 includes information regarding each button to which the user can assign a function that she/he desires to assign, and, for example, includes information representing that no functions are assigned or the name of an assigned function.

The controller image 314 is an image schematically depicting the controller 18. The screen generating section 216 sets the controller image 314 such that the controller image 314 matches the posture of the controller 18 selected on the orientation screen 300 and, stated differently, matches the positional relation between the analog stick section 402 and the button section 404 determined by the posture determining section 222. In a case where a particular button is focused on the button list 312, the screen generating section 216 highlights, in the controller image 314, the position of the focused button. For example, in the controller image 314 in FIG. 10, the center button is highlighted.

On the button assignment customization screen 310 in the profile edit mode, the edit-related functions that are enabled in the edit mode are assigned to buttons at predetermined positions of the controller 18. The edit-related functions can also be said to be functions that are essential in editing of a profile and, for example, include the determination function (which can also be said to be a function to proceed to the next step in the editing) and the cancellation function (which can also be said to be a function to return to the previous step in the editing).

The current assignment information 304 represents the edit-related functions assigned to respective buttons on the button assignment customization screen 310. In the embodiment, the current assignment information 304 represents function assignment information set in the default profile which is the applied profile on the button assignment customization screen 310. The current assignment information 304 in FIG. 9 represents that the function A (e.g., the determination function) is assigned to the center button, the function B (e.g., the cancellation function) is assigned to the button 5, and a left analog stick function is assigned to the analog stick 403.

In addition, the current assignment information 304 includes an image of the controller 18. As the posture of the controller 18 in the current assignment information 304 (which is the positional relation between the analog stick section 402 and the button section 404, and can also be said to be the orientation of the controller 18), the screen generating section 216 sets a posture of the controller 18 having been recognized at the time point when an instruction for displaying the button assignment customization screen 310 has been made. The posture of the controller 18 having been recognized at the time point when an instruction for a transition to the button assignment customization screen 310 has been made is typically a posture of the controller 18 selected by the user on the orientation screen 300. The current assignment information 304 in FIG. 10 represents that the posture of the controller 18 recognized by the information processing apparatus 12 is the +270 posture in FIG. 9.

As specifically described later, on the basis of the positional relation between the analog stick section 402 and the button section 404 (stated differently, the posture of the controller 18), the operation information generating section 114 of the controller 18 generates operation information related to input operation on the analog stick section 402. As the positional relation between the analog stick section 402 and the button section 404 in the profile edit mode, the profile switching section 120 of the controller 18 applies the positional relation between the analog stick section 402 and the button section 404 defined immediately before the transition to the profile edit mode.

That is, the profile switching section 120 applies the default profile to the button mapping in the profile edit mode. In contrast, the profile switching section 120 does not apply the default profile to the positional relation between the analog stick section 402 and the button section 404. As the positional relation between the analog stick section 402 and the button section 404 in the profile edit mode, the profile switching section 120 applies a positional relation defined in a profile that has been applied immediately before the transition to the profile edit mode and that is typically the target of the button mapping edit.

On the button assignment customization screen 310, the user selects a desired button from the button list 312 by using the analog stick 403, the center button, or the like of the controller 18, and inputs operation to assign a desired function to the selected button. For example, functions that can be assigned may include the determination function (or A button), the cancellation function (or B button), the option function, or the like.

On the button assignment customization screen 310, a function desired by the user to be enabled after the termination of the profile edit mode, and also a function different from a function set in the default profile can be assigned to a button at a predetermined position to which an edit-related function is assigned in the default profile represented by the current assignment information 304. Stated differently, the profile setting section 226 of the information processing apparatus 12 permits assignment of a function different from a function set in the default profile, to a button at a predetermined position to which an edit-related function is assigned in the default profile.

For example, the user can assign the cancellation function (or B button) or the option function to the center button to which the determination function (or A button) is assigned in the default profile. In addition, the user can assign the determination function (or A button) or the option function to the button 5 to which the cancellation function (or B button) is assigned in the default profile.

In addition, on the button assignment customization screen 310, a freely-selected button of the controller 18 can be set to the toggle mode. The user can select a freely-selected button from the button list 312, assign a desired function to the button, and also enable the toggle mode of the button.

Note that, as depicted in FIG. 1, the information processing apparatus 12 can be connected with the multiple controllers 18 (e.g., the controller 18*a* and the controller 18*b*) simultaneously. The edit-mode top screen includes an element for selecting a profile-edit-target controller 18 from the multiple controllers 18. The edit mode setting section 220 of the information processing apparatus 12 transmits an instruction for a transition to the edit mode to the controller 18 (here, called a "target controller") selected as the profile edit target among the multiple controllers 18.

Upon accepting the instruction for a transition to the edit mode, the light-emission control section 122 of the target controller starts putting on the light-emitting section 408 of the button section 404. The button assignment customization screen 310 displayed in the edit mode includes an image which represents the target controller and which represents that the light-emitting section 408 is put on.

Specifically, the screen generating section 216 of the information processing apparatus 12 sets the controller image 314 and the current assignment information 304 on the button assignment customization screen 310 in such a manner that they represent that a portion equivalent to the light-emitting section 408 (a circular region surrounding the center button) is emitting light. As a result, in a case where the multiple controllers 18 are connected to the information processing apparatus 12, it is possible to assist the user such that she/he can easily identify the profile-edit-target controller 18.

When save and termination operation (e.g., operation to select Done button) is input on the button assignment customization screen 310, the assessing section 224 of the information processing apparatus 12 assesses whether or not each preset essential function is assigned to any one of the multiple buttons on the button assignment customization screen 310.

Returning to FIG. 8, in a case where at least one essential function is assigned to none of the multiple buttons (Y in S22), the assessing section 224 identifies the unassigned essential function. The screen generating section 216 of the information processing apparatus 12 generates data of an alert window as a notification representing that the essential function is left unassigned. The display control section 218 causes the alert window to be displayed over the button assignment customization screen 310 (S24).

Figure 11:
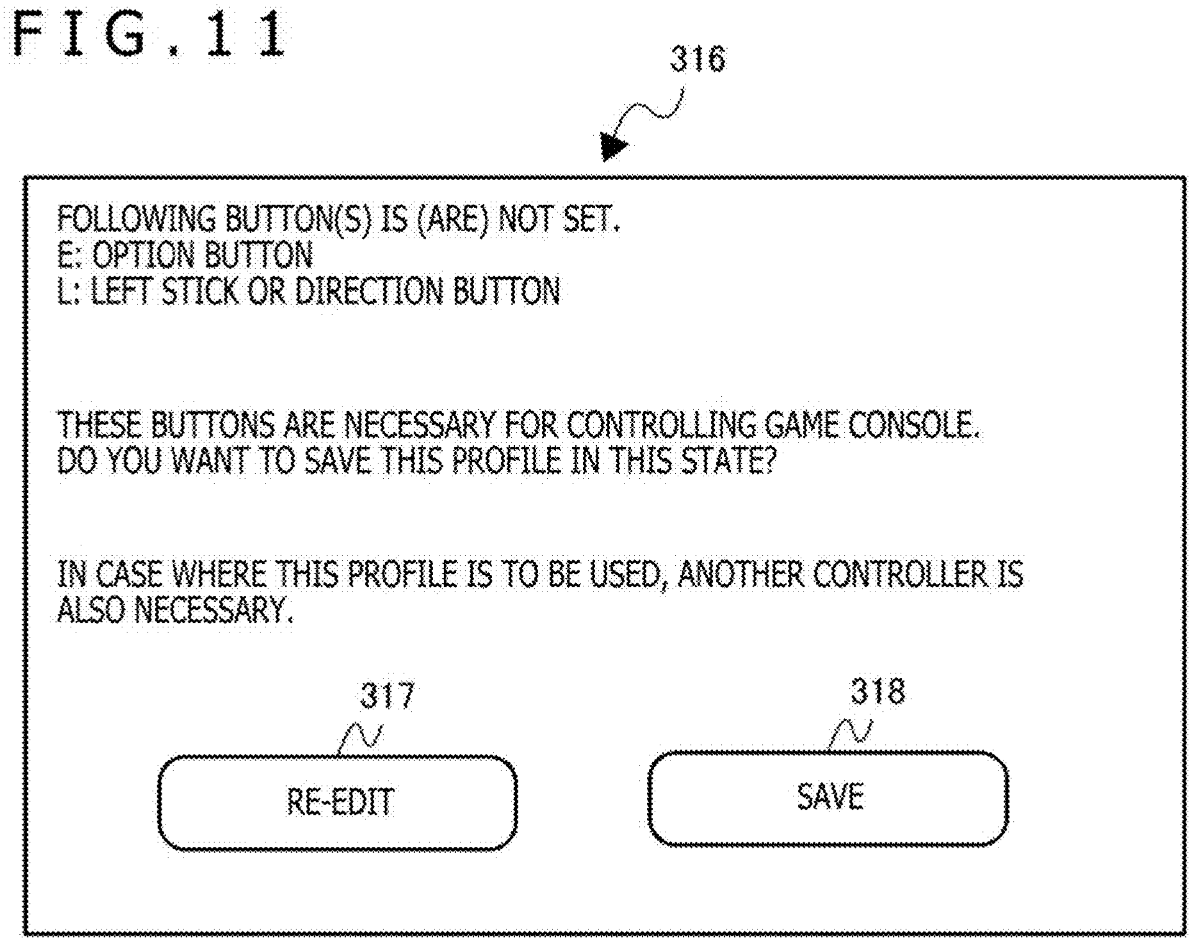
FIG. 11 is a figure depicting an example of an alert window.

FIG. 11 depicts an example of an alert window 316. The alert window 316 includes alert information. The alert information represents the essential function that is assigned to none of the multiple buttons of the controller 18. In addition, the alert information includes contents prompting to assign the essential function to any one button of the controller 18. In addition, the alert window 316 includes a choice to return to the button assignment customization screen 310 and a choice to save edited contents on the button assignment customization screen 310. Specifically, the alert window 316 includes a re-edit button 317 and a save button 318 as those choices. If selection of the re-edit button 317 on the alert window 316 is detected (N in S26), saving is cancelled, the procedure returns to S20, and the display control section 218 continues displaying the button assignment customization screen 310.

If selection of the save button 318 on the alert window 316 is detected (Y in S26), the profile setting section 226 of the information processing apparatus 12 sets profile information including information regarding function assignment to each button set on the button assignment customization screen 310. The information regarding function assignment to each button includes information representing that the toggle mode of each button is enabled or disabled.

The profile registering section 228 of the information processing apparatus 12 saves the profile information set by the profile setting section 226, on the profile storage section 204 of the information processing apparatus 12. In addition, the profile registering section 228 transmits, to the controller 18, the profile information set by the profile setting section 226, and causes the profile storage section 102 of the controller 18 to store the profile information (S28).

As depicted in FIG. 1, in the information processing system 10 according to the embodiment, the multiple controllers 18 and the controller 16 can be connected to the information processing apparatus 12. Accordingly, even if an essential function of one controller 18 is left unassigned, there is a possibility that the essential function is assigned to another controller 18 or the controller 16. Accordingly, in the profile editing of the one controller 18, saving of a profile in which an essential function is left unassigned is permitted. As a result, the degree of freedom of assignment of a function to each button of the controllers 18 can be enhanced.

Note that, on the basis of button assignment information regarding all controllers associated with a user ID, the application executing section 214 of the information processing apparatus 12 may detect that an essential function is left unassigned in all the controllers, in a case where the essential function is left unassigned in all the controllers, at the time when an application is started or at the time when an application is resumed from the profile edit mode. In a case where it is detected that an essential function is left unassigned in all the controllers, the application executing section 214 may cause the display to display a message that represents the essential function is left unassigned and, stated differently, prompts to assign the essential function, before the application is executed.

In a case where each of all the essential functions is assigned to any one of the multiple buttons (N in S22), the processes in S24 and S26 are skipped, and the procedure proceeds to the profile saving process in S28. If the button mapping edit is not selected on the edit-mode top screen (N in S18), the processes in S20 to S28 are skipped.

If the analog-stick sensitivity adjustment is selected on the edit-mode top screen (Y in S30), the screen generating section 216 of the information processing apparatus 12 generates data of the sensitivity adjustment screen. The display control section 218 causes the display apparatus 14 to display the sensitivity adjustment screen (S32).

Figure 12:
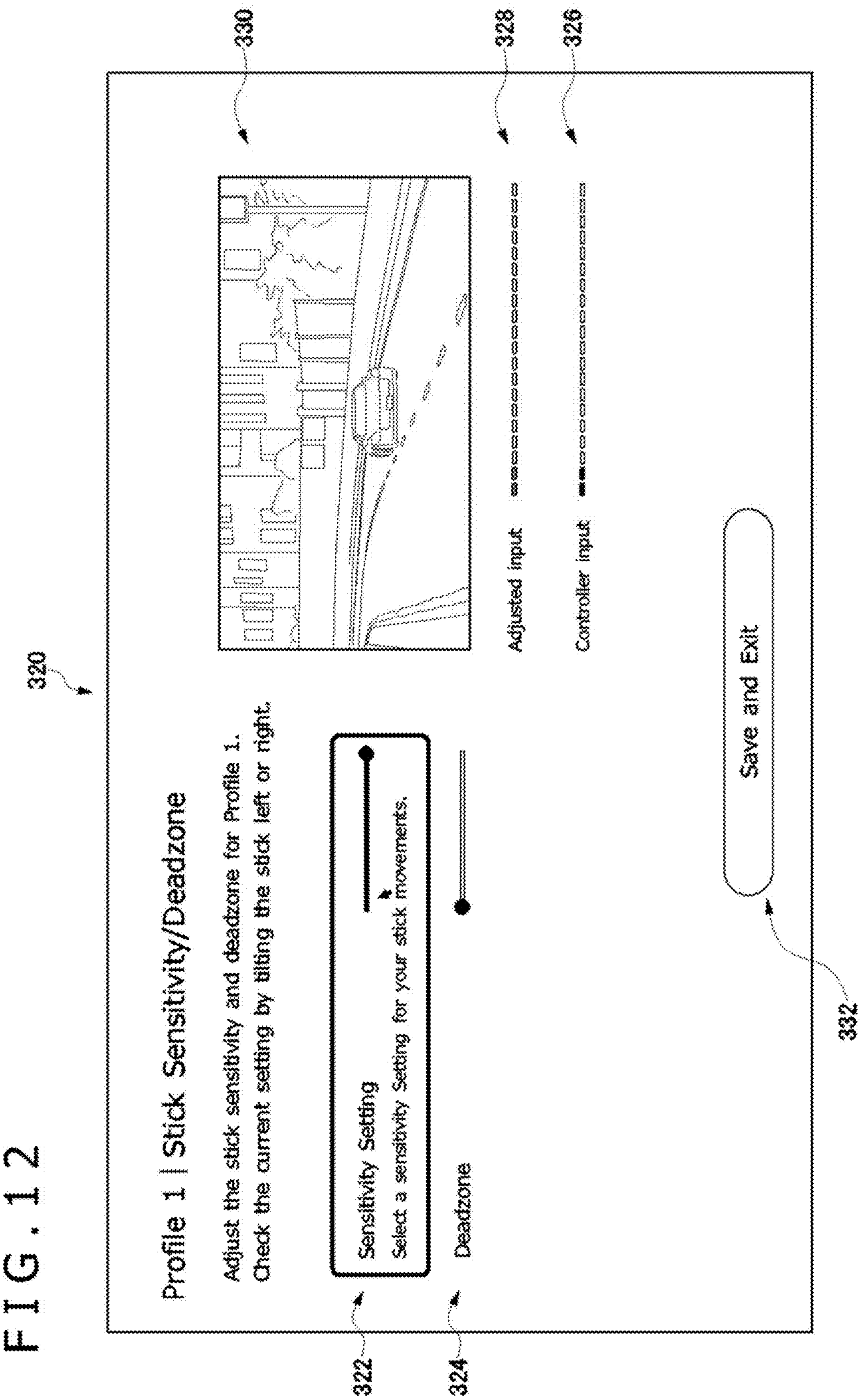
FIG. 12 is a figure depicting an example of a sensitivity adjustment screen.

FIG. 12 depicts an example of the sensitivity adjustment screen 320. The sensitivity adjustment screen 320 includes a sensitivity setting gauge 322, a deadzone setting gauge 324, a controller input value indicator 326, an adjusted input value indicator 328, a sensitivity suggestion video 330, and a save button 332.

The sensitivity setting gauge 322 is an object for allowing the user to adjust and set the sensitivity of the analog stick 403. The sensitivity decreases as the set position on the sensitivity setting gauge 322 moves to the left, and the sensitivity increases as the set position on the sensitivity setting gauge 322 moves to the right. The sensitivity may be the rate (i.e., tilt) of a change of an output value in response to a change of a value of input to the analog stick 403. As the sensitivity increases, the tilt may increase, and as the sensitivity decreases, the tilt may decrease. The information processing apparatus 12 serially notifies the controller 18 of a value of the sensitivity setting of the sensitivity setting gauge 322.

The deadzone setting gauge 324 is an object for allowing the user to adjust and set the size of the deadzone of the analog stick 403. The deadzone becomes smaller as the set position on the deadzone setting gauge 324 moves to the left, and the deadzone becomes larger as the set position on the deadzone setting gauge 324 moves to the right. As mentioned already, the deadzone may be an area where, even if operation of the analog stick 403 is input in the area, a value that accompanies the operation is not input to the information processing apparatus 12, and, stated differently, may be the width of play of the analog stick 403. The information processing apparatus 12 serially notifies the controller 18 of a value of the deadzone setting of the deadzone setting gauge 324.

The controller input value indicator 326 is an object representing the magnitude of tilt operation (hereinafter also called a "controller input value") input to the analog stick 403. The screen generating section 216 moves graduations of the controller input value indicator 326 according to tilt operation on the analog stick 403 by the user. As the tilt operation input to the analog stick 403 increases, stated differently, as the tilt amount of the analog stick 403 increases, the screen generating section 216 moves graduations to the right.

The adjusted input value indicator 328 is an object representing a value (hereinafter also called an "adjusted input value") obtained by adjusting, on the basis of the sensitivity set with the sensitivity setting gauge 322, the magnitude of tilt operation input to the analog stick 403. As the adjusted input value increases, the screen generating section 216 moves graduations to the right.

The sensitivity suggestion video 330 is a video for suggesting the state of the sensitivity. The sensitivity suggestion video 330 according to the embodiment is an animation depicting a scene where an automobile approaches and passes by. As a modification example, the sensitivity suggestion video 330 may be a video of a three-dimensional object captured by a camera which keeps pointing the three dimensional object and which moves around from a side to the front side of the three dimensional object.

In a case where predetermined operation (tilt operation in the embodiment) is input to the analog stick 403 while the sensitivity adjustment screen 320 is displayed, the screen generating section 216 causes the sensitivity suggestion video 330 to be reproduced in a manner according to the sensitivity adjusted with the sensitivity setting gauge 322. Specifically, as the sensitivity after adjustment with the sensitivity setting gauge 322 increases, the screen generating section 216 increases the reproduction speed of the sensitivity suggestion video 330 that accompanies the operation input to the analog stick 403.

Figure 13:
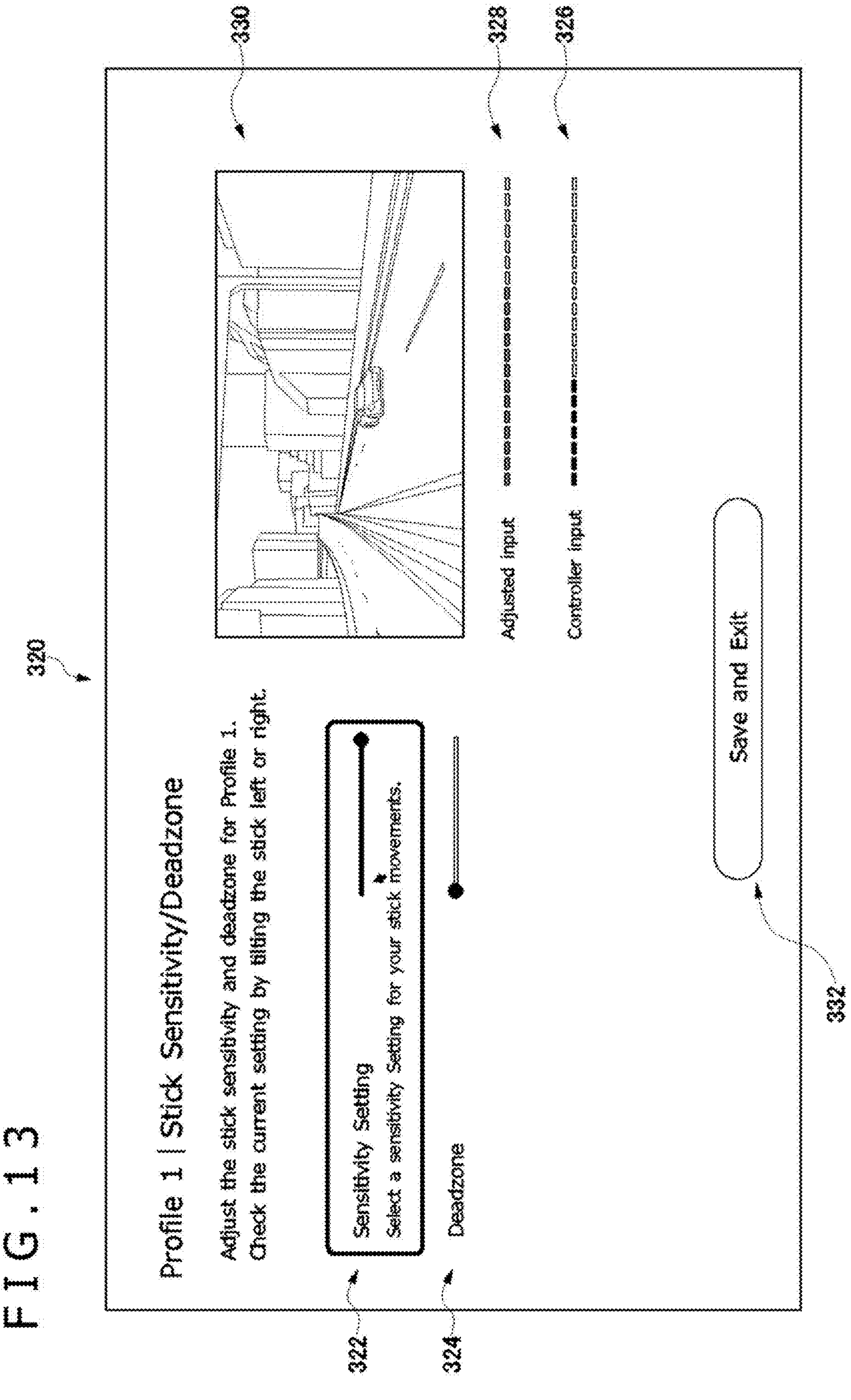
FIG. 13 is a figure depicting an example of the sensitivity adjustment screen.
Figure 14:
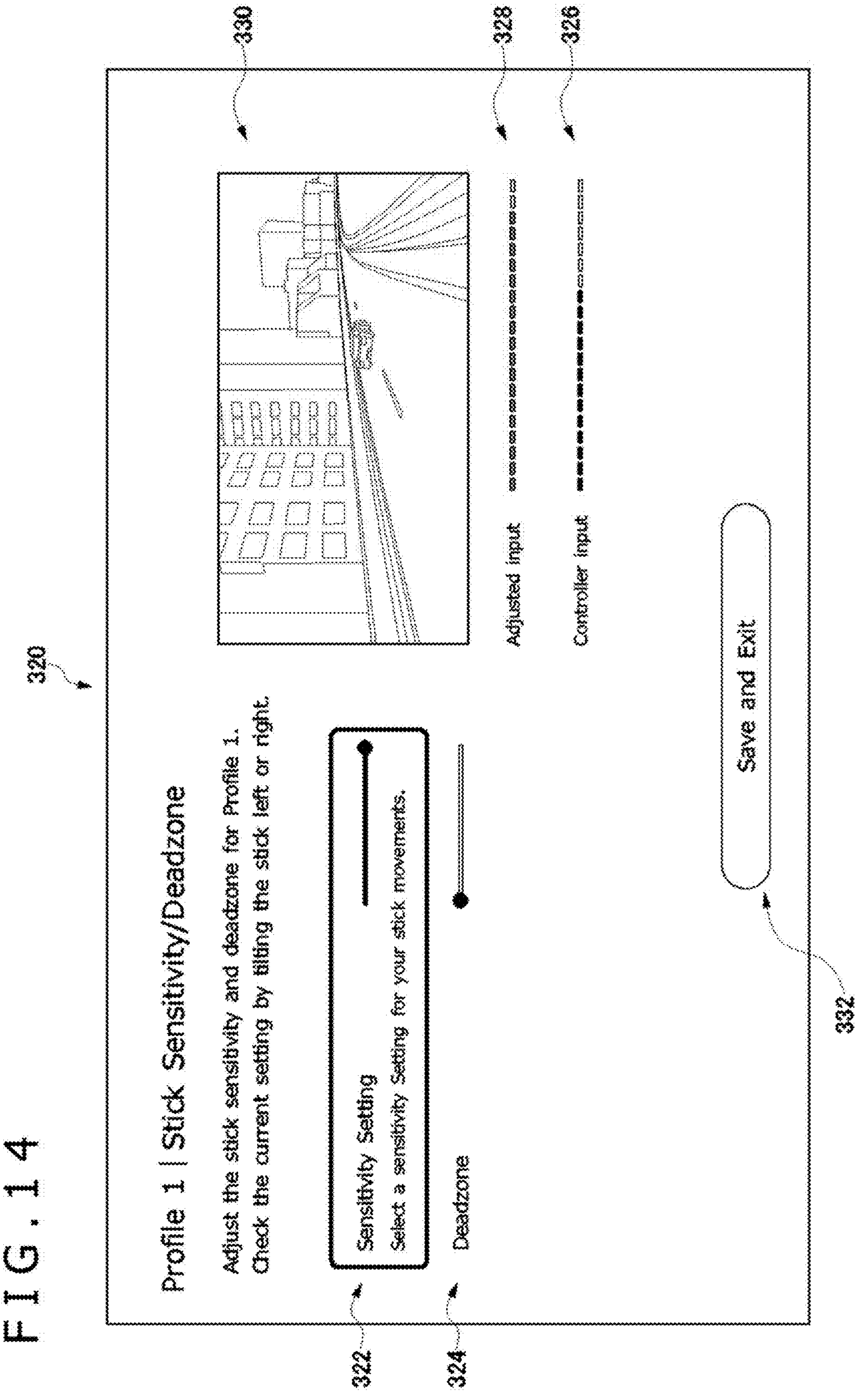
FIG. 14 is a figure depicting an example of the sensitivity adjustment screen.

FIG. 12, FIG. 13, and FIG. 14 depict changes in a time series of the sensitivity adjustment screen 320 in a case where the set sensitivity is high, and the content of the sensitivity adjustment screen 320 switches from one to another in the order of FIG. 12, FIG. 13, and FIG. 14. As represented by the controller input value indicator 326 in each figure, the user gradually increases the tilt amount of the analog stick 403.

The operation information generating section 114 (the calibrating section 116) of the controller 18 acquires a controller input value which is an input value based on the tilt amount of the analog stick 403. The operation information generating section 114 (the calibrating section 116) adjusts the acquired controller input value on the basis of the sensitivity set with the sensitivity setting gauge 322, and obtains an adjusted input value. The operation information transmitting section 118 of the controller 18 transmits, to the information processing apparatus 12, operation information including both the controller input value and the adjusted input value.

On the basis of the controller input value represented by the operation information, the screen generating section 216 of the information processing apparatus 12 sets graduations of the controller input value indicator 326. In addition, on the basis of the adjusted input value represented by the operation information, the screen generating section 216 sets graduations of the adjusted input value indicator 328. Since the sensitivity is high here, the adjusted input value increases relatively significantly along with a relatively small increase of the controller input value.

In addition, respective graduation positions of the adjusted input value indicator 328 are associated with reproduction time positions of the sensitivity suggestion video 330. The screen generating section 216 causes the sensitivity suggestion video 330 to be reproduced in synchronization with changes of graduations of the adjusted input value indicator 328. Since graduations of the adjusted input value indicator 328 are expanded rapidly in a case where the sensitivity is high, the reproduction speed of the sensitivity suggestion video 330 increases. That is, as the sensitivity of the analog stick 403 set on the sensitivity adjustment screen 320 increases, the screen generating section 216 increases the reproduction speed of the sensitivity suggestion video 330. In the sensitivity suggestion video 330 in FIG. 12 to FIG. 14, a scene where an automobile approaches and passes by at high speed is displayed.

In addition, respective graduation positions of the adjusted input value indicator 328 are associated also with reproduction time positions of a predetermined sensitivity suggestion sound for suggesting the state of the sensitivity. For example, the sensitivity suggestion sound may be a sound generated by a musical instrument. The sound output section 230 causes the sensitivity suggestion sound to be reproduced in synchronization with changes of graduations of the adjusted input value indicator 328. Since graduations of the adjusted input value indicator 328 are expanded rapidly in a case where the sensitivity is high, the reproduction speed of the sensitivity suggestion sound relatively increases. That is, as the sensitivity of the analog stick 403 set on the sensitivity adjustment screen 320 increases, the sound output section 230 increases the tempo of the sensitivity suggestion sound.

Figure 15:
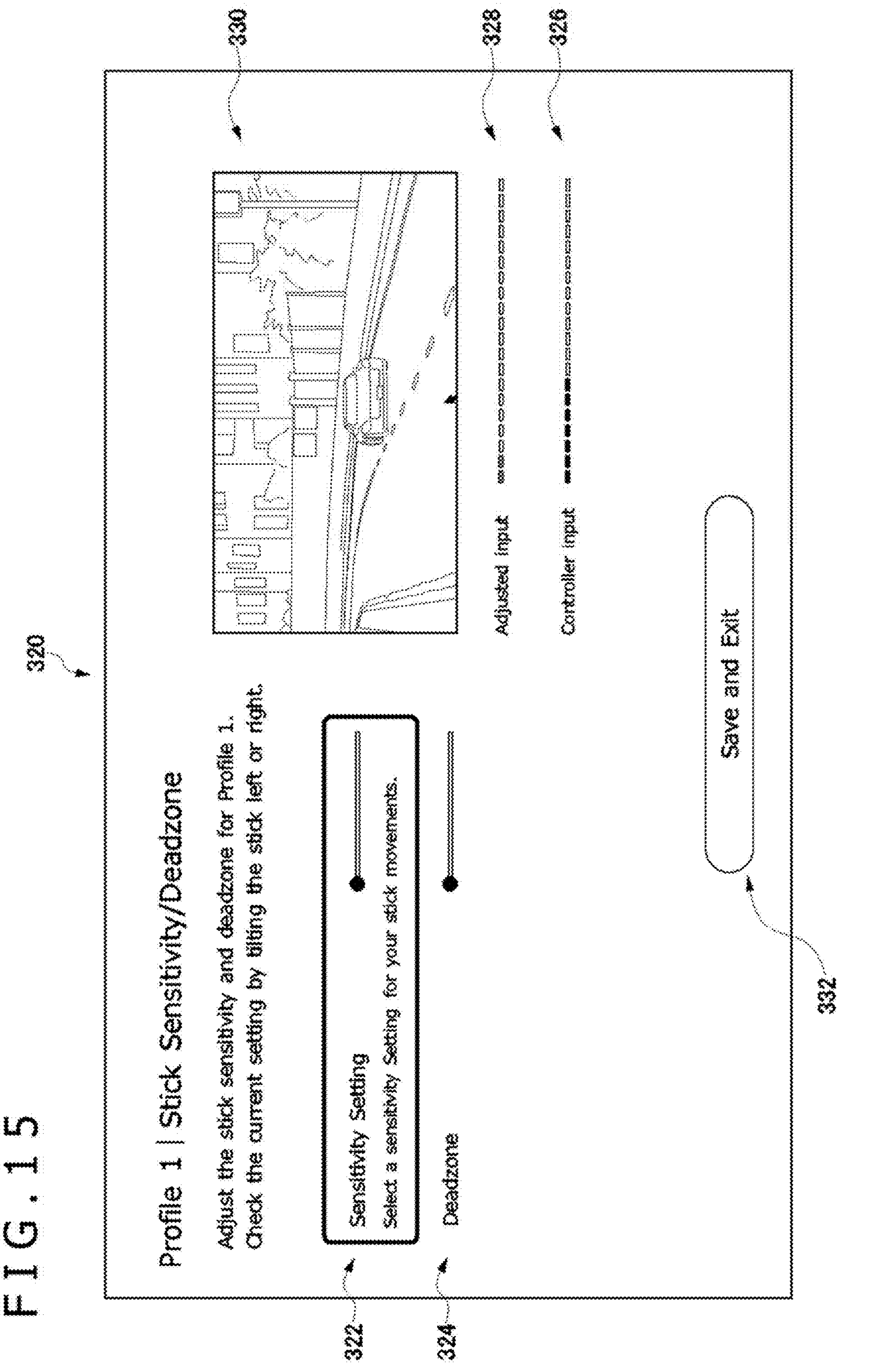
FIG. 15 is a figure depicting an example of the sensitivity adjustment screen.
Figure 16:
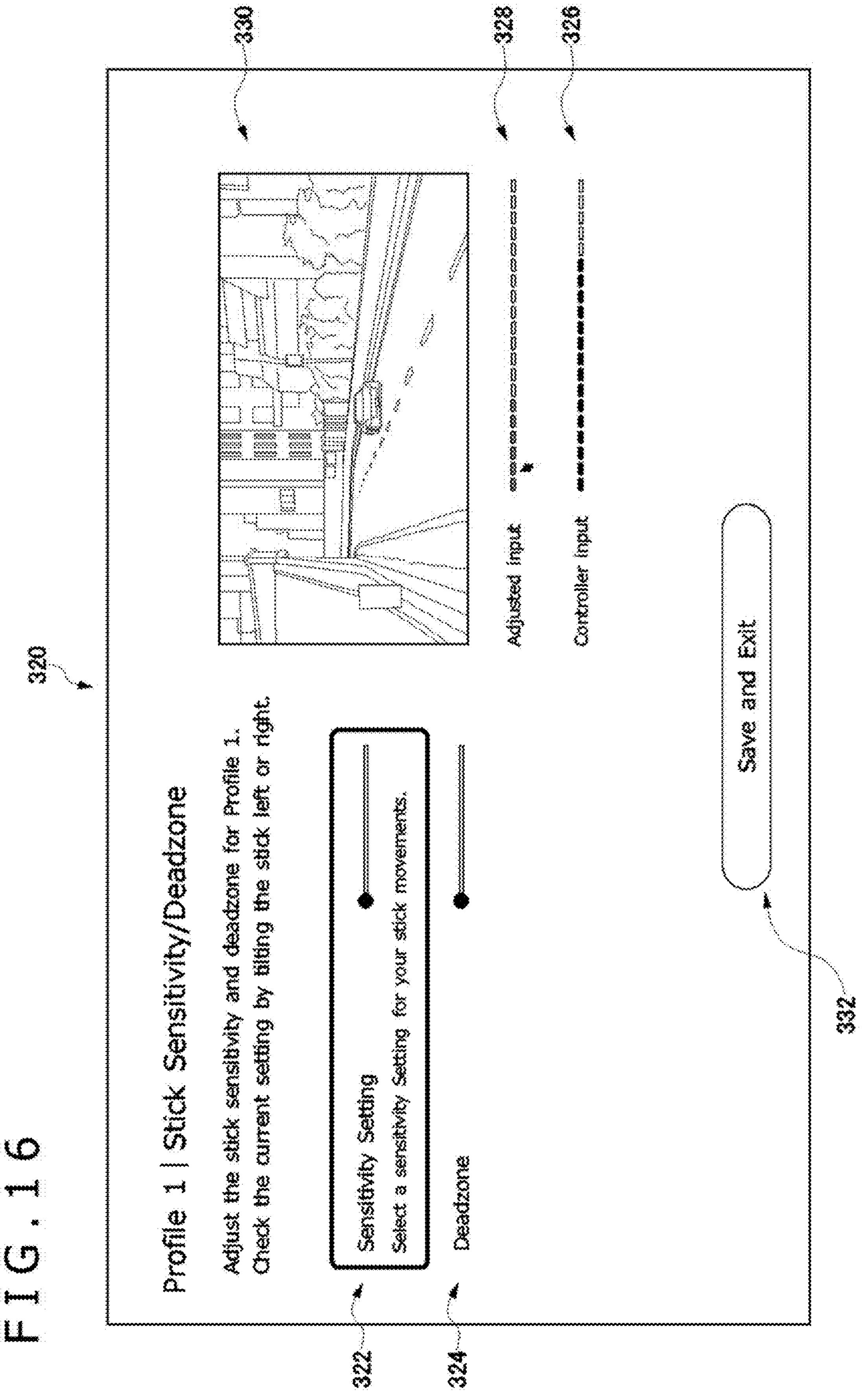
FIG. 16 is a figure depicting an example of the sensitivity adjustment screen.

FIG. 15 and FIG. 16 depict changes in a time series of the sensitivity adjustment screen 320 in a case where the set sensitivity is low, and the content of the sensitivity adjustment screen 320 switches from one to another in the order of FIG. 15 and FIG. 16. As represented by the controller input value indicator 326 in each figure, the user gradually increases the tilt amount of the analog stick 403. Since the sensitivity is low here, change amounts of the adjusted input value become smaller than change amounts of the controller input value.

Since the expansion of graduations of the adjusted input value indicator 328 is gentle in a case where the sensitivity is low, the reproduction speed of the sensitivity suggestion video 330 increases. That is, as the sensitivity of the analog stick 403 set on the sensitivity adjustment screen 320 decreases, the screen generating section 216 decreases the reproduction speed of the sensitivity suggestion video 330. In the sensitivity suggestion video 330 in FIG. 12 to FIG. 14, a scene where an automobile approaches slowly is reproduced.

In addition, since the expansion of graduations of the adjusted input value indicator 328 is gentle in a case where the sensitivity is low, the reproduction speed of the sensitivity suggestion sound decreases relatively. That is, as the sensitivity of the analog stick 403 set on the sensitivity adjustment screen 320 decreases, the sound output section 230 decreases the tempo of the sensitivity suggestion sound.

Returning to FIG. 8, if the save button 332 is selected on the sensitivity adjustment screen 320 (Y in S34), the profile setting section 226 of the information processing apparatus 12 sets profile information including the sensitivity and deadzone setting value set on the sensitivity adjustment screen 320. The profile registering section 228 of the information processing apparatus 12 causes the profile storage section 204 of the information processing apparatus 12 and the profile storage section 102 of the controller 18 to store the profile information (S36).

If the save button 332 is not selected on the sensitivity adjustment screen 320 (N in S34), the process in S36 is skipped. If the analog-stick sensitivity adjustment is not selected on the edit-mode top screen (N in S30), the processes in S32 to S36 are skipped. If user operation which is an instruction for a transition to the profile edit mode is not input (N in S10), the processes in S12 to S36 are skipped.

At the time of a transition to the profile edit mode, the user can select the controller 18 to retain the edit-target profile. In a case where the controller 18*a* and the controller 18*b* are connected to the information processing apparatus 12 as depicted in FIG. 1, postural information registration, assignment of functions to buttons, and sensitivity setting for each of the controller 18*a* and the controller 18*b* are possible. For example, the user can use the controller 18*a* with the default posture in FIG. 9. On the other hand, the user can use the controller 18*b* with the +180 posture in FIG. 9. In addition, the user can assign the same functions to both buttons of the controller 18*a* and buttons of the controller 18*b*. In addition, the user can also assign particular functions to only any one of buttons of the controller 18*a* and buttons of the controller 18*b*.

If operation is input to the analog stick 403 or a button of the controller 18 after termination of the profile edit mode, the operation information generating section 114 of the controller 18 generates operation information by applying a particular profile (e.g., a profile specified by the user) stored on the profile storage section 102. For example, the operation information generating section 114 generates operation information representing a function (e.g., the determination function, the A function, the B function, etc.) assigned to a button for which operation is input in the applied profile. The operation information transmitting section 118 of the controller 18 transmits the operation information to the information processing apparatus 12. According to the operation information transmitted from the controller 18, the application executing section 214 of the information processing apparatus 12 executes system software and application software.

As mentioned already, the button assignment customization screen 310 can be terminated in a state where an essential function is assigned to none of the buttons. While this enhances the degree of freedom of assignment of functions to buttons, this can cause inconvenience to operation of system software or application software.

In view of this, in a case where predetermined operation is input, the profile switching section 120 of the controller 18 switches to a profile in which an essential function is assigned to at least one of multiple buttons of the controller 18. The predetermined operation described above is long-pressing operation of the profile button 406 for a predetermined length of time or longer in the embodiment. The profile to be applied after the switching may be the default profile in which each of the determination function, the cancellation function, the option function, and the left analog stick function is assigned to at least one button. As a result, while enhancing the degree of freedom of assignment of functions to buttons, it is possible to prevent inconvenience from being caused to operation of system software or application software.

Processes at the controller 18 are explained in further details. The calibrating section 116 of the operation information generating section 114 derives values that should be set in operation information, by calibrating, on the basis of a positional relation between the analog stick section 402 and the button section 404 represented by an applied profile, values based on operation input to the analog stick 403. For example, the values based on the operation input to the analog stick 403 are output value information on a two-dimensional plane as depicted in FIG. 4. Specifically, they are an output value in the X-axis direction and an output value in the Y-axis direction.

In a case where the positional relation between the analog stick section 402 and the button section 404 is "Default" in FIG. 9, the calibrating section 116 may skip calibration of the output value in the X-axis direction and the output value in the Y-axis direction. That is, if the posture of the controller 18 is the default posture, only sensitivity calibration may be executed without performing positional calibration. In a case where the positional relation between the analog stick section 402 and the button section 404 is "+90" in FIG. 9, the calibrating section 116 may determine, as values obtained after positional calibration, values obtained by rotationally moving the output value in the X-axis direction and the output value in the Y-axis direction 90 degrees clockwise.

In a case where the positional relation between the analog stick section 402 and the button section 404 is "+180" in FIG. 9, the calibrating section 116 may determine, as values obtained after positional calibration, values obtained by rotationally moving the output value in the X-axis direction and the output value in the Y-axis direction 180 degrees clockwise. In a case where the positional relation between the analog stick section 402 and the button section 404 is "+270" in FIG. 9, the calibrating section 116 may determine, as values obtained after positional calibration, values obtained by rotationally moving the output value in the X-axis direction and the output value in the Y-axis direction 270 degrees clockwise. The calibrating section 116 executes, on the values obtained after the positional calibration, sensitivity calibration based on sensitivity information represented by the applied profile.

As a modification example, the information processing apparatus 12 having received operation information from the controller 18 may execute a process of profile application other than the sensitivity calibration. For example, the process of profile application other than the sensitivity calibration includes determination of an operation direction based on the posture of the controller 18 (the positional relation between the analog stick section 402 and the button section 404) and identification of functions assigned to buttons of the controller 18.

Figure 17:
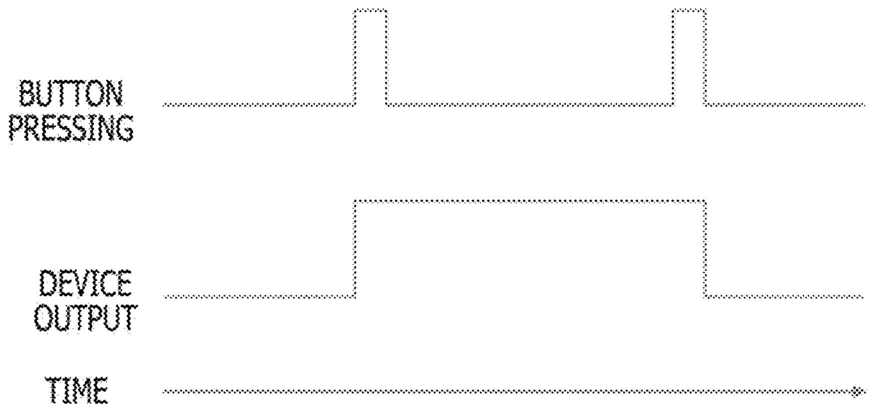
FIG. 17 is a figure depicting a behavior of a button for which a toggle mode is enabled.

FIG. 17 depicts a behavior of a button for which a toggle mode is enabled. A user can set each button of the controller 18 to the toggle mode independently. Upon detection of short-pressing operation (short-time pressing operation) performed once on a button for which the toggle mode is enabled (here, also called a "toggle mode button"), the operation information generating section 114 of the controller 18 generates operation information representing that the input state of the toggle mode button is continuing, as in a case where long-pressing operation is accepted. It is supposed in the embodiment that short-pressing operation triggers continuation of the input state of the toggle mode button. The operation information generating section 114 may generate, consecutively at predetermined intervals, multiple pieces of operation information representing that the toggle mode button is pressed, and the operation information transmitting section 118 may transmit the multiple pieces of operation information to the information processing apparatus 12 consecutively.

In addition, the input state of the toggle mode button continues until short-pressing operation on the toggle mode button is input again. Upon detection of short-pressing operation performed again on the toggle mode button during the continuation of the input state of the toggle mode button, the operation information generating section 114 terminates the generation of the operation information representing that the input state of the toggle mode button is continuing.

Returning to FIG. 8, upon input of selection operation on the toggle mode button (short-pressing operation in the embodiment) (Y in S38), the screen generating section 216 of the information processing apparatus 12 causes toggle feedback including information regarding the continuation of the input state of the toggle mode button (hereinafter also called "toggle mode button information") to be displayed (S40). If selection operation on the toggle mode button is not input (N in S38), the process in S40 is skipped. In addition, upon input of deselection operation on the toggle mode button (short-pressing operation performed again in the embodiment) (Y in S42), the displaying of the toggle feedback is terminated (S44). If deselection operation on the toggle mode button is not input (N in S42), the process in S44 is skipped.

Figure 18:
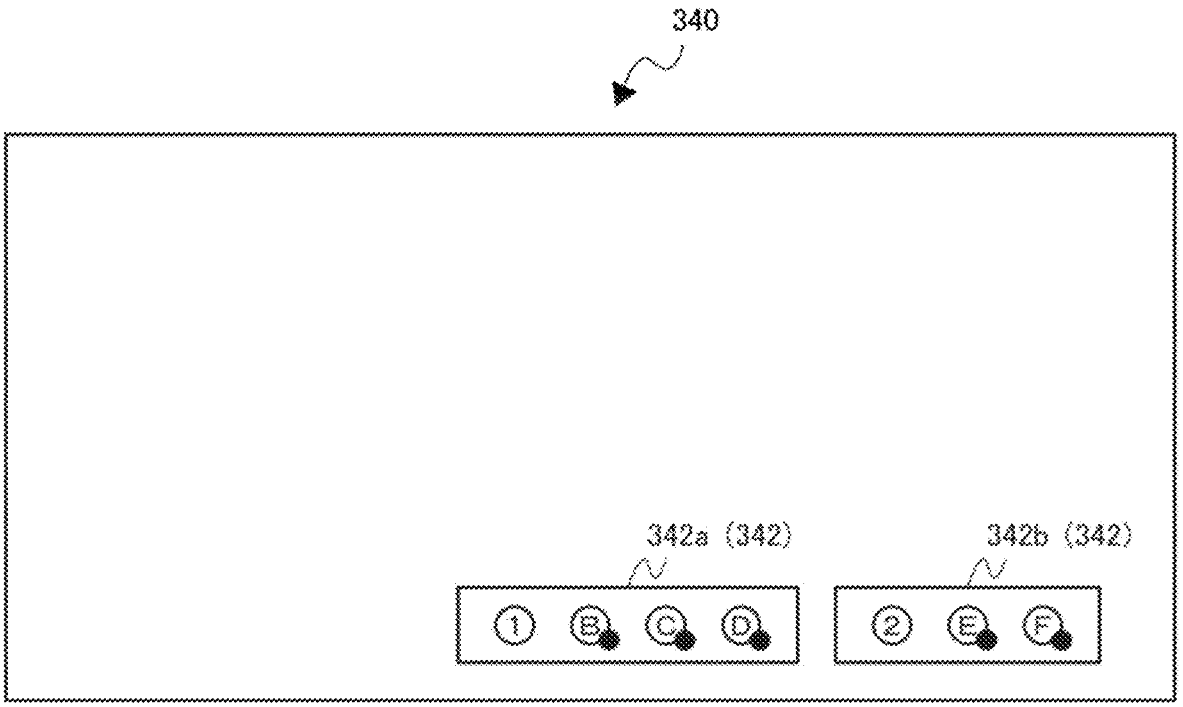
FIG. 18 is a figure depicting an example of an application screen.

FIG. 18 depicts an example of an application screen 340. Here, the information processing apparatus 12 is connected with the controller 18*a* and the controller 18*b*, and the toggle mode of multiple buttons of each of the controller 18*a* and the controller 18*b* is enabled. The screen generating section 216 of the information processing apparatus 12 causes the toggle mode button information to be displayed separately for each controller connected to the information processing apparatus 12. In the embodiment, the screen generating section 216 causes the toggle mode button information related to a certain button to be displayed while the toggle mode of the button is enabled and the input state of the button is continuing.

In the example in FIG. 18, the screen generating section 216 sets toggle feedback 342*a* and toggle feedback 342*b* (called "toggle feedback 342" when they are collectively referred to) on the application screen 340. The toggle feedback 342*a* includes toggle mode button information regarding the controller 18*a*. The toggle mode button information regarding the controller 18*a* includes identification information (represented by a circled number 1 in the figure) regarding the controller 18*a*. The toggle feedback 342*b* includes toggle mode button information regarding the controller 18*b*. The toggle mode button information regarding the controller 18*b* includes identification information (represented by a circled number 2 in the figure) regarding the controller 18*b*.

The toggle mode button information includes identification information (icons of buttons in FIG. 18) regarding buttons set to the toggle mode. The identification information regarding the buttons may be information (e.g., icons or marks representing the A function and the B function) representing functions assigned to the buttons. In addition, the identification information regarding the buttons may be numbers (e.g., 1 to 8) of the buttons. The toggle feedback 342*a* in FIG. 18 represents that the toggle mode of B button, C button, and D button of the controller 18*a* is enabled and the input state of those buttons is continuing. For example, in a case where the toggle mode of A button provided on the controller 18*a* is enabled and short-pressing of A button triggered continuation of the input state of A button, the screen generating section 216 adds the identification information regarding A button to the toggle feedback 342*a*.

The toggle feedback 342*b* in FIG. 18 represents that the toggle mode of E button and F button of the controller 18*b* is enabled and the input state of those buttons is continuing. For example, in a case where F button is short-pressed again and continuation of the input state of F button is terminated, the screen generating section 216 deletes information regarding F button from the toggle feedback 342*b*. Whereas FIG. 18 illustrates the application screen 340, the toggle feedback 342 is displayed similarly on a system screen related to execution of system software.

In addition, in the embodiment, under a condition that the toggle mode of a certain button is enabled and the input state of the button is continuing, the screen generating section 216 causes the toggle feedback 342 to display a set of identification information regarding the button and a predetermined mark (a black circle in FIG. 18). As a modification example, in a case where the toggle mode of a certain button is enabled, the screen generating section 216 may cause the toggle feedback 342 to continuously display identification information regarding the button independently of whether or not the input state of the button is continuing. While the input state of the button is continuing, the screen generating section 216 may add the mark described above to the identification information regarding the button. In addition, in a case where the continuation of the input state of the button is terminated, the screen generating section 216 may erase the mark described above added to the identification information regarding the button. In addition, depending on whether the input state of a button for which the toggle mode is enabled is continuing or the continuation of the input state is terminated, the screen generating section 216 may change the color of the icon of the button or may change the color of a frame in which the icon of the button is arranged.

As toggle mode information, the screen generating section 216 causes information regarding continuation of the input state of up to a predetermined number of buttons among multiple buttons for which the toggle mode is enabled to be displayed. That is, a maximum display number (the predetermined number described above) of button icons in one piece of toggle feedback 342 is preset. In addition, the maximum display number of button icons in the toggle feedback 342 corresponding to each controller 18 differs depending on whether there is one controller 18 having buttons whose toggle mode is enabled or there are multiple controllers 18 having buttons whose toggle mode is enabled. Typically, as the number of controllers 18 having buttons whose toggle mode is enabled increases, that is, as the number of pieces of screen-displayed toggle feedback 342 increases, the maximum display number of button icons in each piece of toggle feedback 342 decreases.

For example, in a case where only one controller 18 has buttons whose toggle mode is enabled and only one piece of toggle feedback 342 is screen-displayed, the maximum display number of button icons may be eleven. On the other hand, in a case where two controllers 18 have buttons whose toggle mode is enabled and two pieces of toggle feedback 342 are screen-displayed, the maximum display number of button icons in each piece of toggle feedback 342 may be eight.

In addition, in a case where the number of buttons among multiple buttons of the controller 18 whose toggle mode is enabled and whose input state is continuing exceeds the maximum display number, the screen generating section 216 further cause the difference between the number of buttons and the maximum display number to be displayed in the toggle feedback 342. For example, in a case where the number of buttons whose toggle mode is enabled, and whose input state is continuing is ten and, on the other hand, the maximum display number of button icons in toggle feedback 342 is eight (in a case where multiple pieces of toggle feedback 342 are being displayed), the screen generating section 216 may arrange eight button icons in the toggle feedback 342, and set "+2," which is the difference between the number of buttons and the maximum display number, next to the eight button icons.

The information processing system 10 according to the embodiment allows users to freely customize the positional relation between the analog stick sections 402 and the button sections 404 on the controllers 18, and can improve the adaptability or convenience of the controllers 18 to or for various users.

In addition, at the time of profile edit, operation using a profile for profile edit (button assignment) is enabled independently of a profile having been applied until then, and accordingly operation in the edit mode can be ensured even in a state where a user has not assigned a function to a button on the controller 18. In addition, by displaying an alert in a case where a function essential for operation of a system or an application is left unassigned to a button, it is possible to enhance the degree of freedom of assignment of functions to buttons by permitting termination of editing in a state where the essential function is left unassigned according to an intension of a user, while the user is prompted to assign the essential function.

In addition, according to the information processing system 10, the states of buttons whose toggle mode is enabled can be presented in an easy-to-understand manner to a user on an application screen or a system screen. In addition, according to the information processing system 10, the adjustment status of the sensitivity can be presented in an easy-to-understand manner to a user by using both visual information and auditory information on the sensitivity adjustment screen 320.

The present disclosure has been explained thus far on the basis of the embodiment. It is understood by those skilled in the art that the embodiment is an illustrative example, various modification examples are possible regarding combinations of constituent elements or processing processes, and such modification examples are also within the scope of the present disclosure.

A first modification example is explained. In the embodiment described above, the posture determining section 222 of the information processing apparatus 12 determines the positional relation between the analog stick section 402 and the button section 404 according to a pattern selected on the orientation screen 300 by a user. As a modification example, the posture determining section 222 may determine the positional relation between the analog stick section 402 and the button section 404 according to input operation on the analog stick section 402 (the analog stick 403) in the profile edit mode in a predetermined direction in a state where the controller 18 is arranged in a freely-selected orientation.

Figure 19:
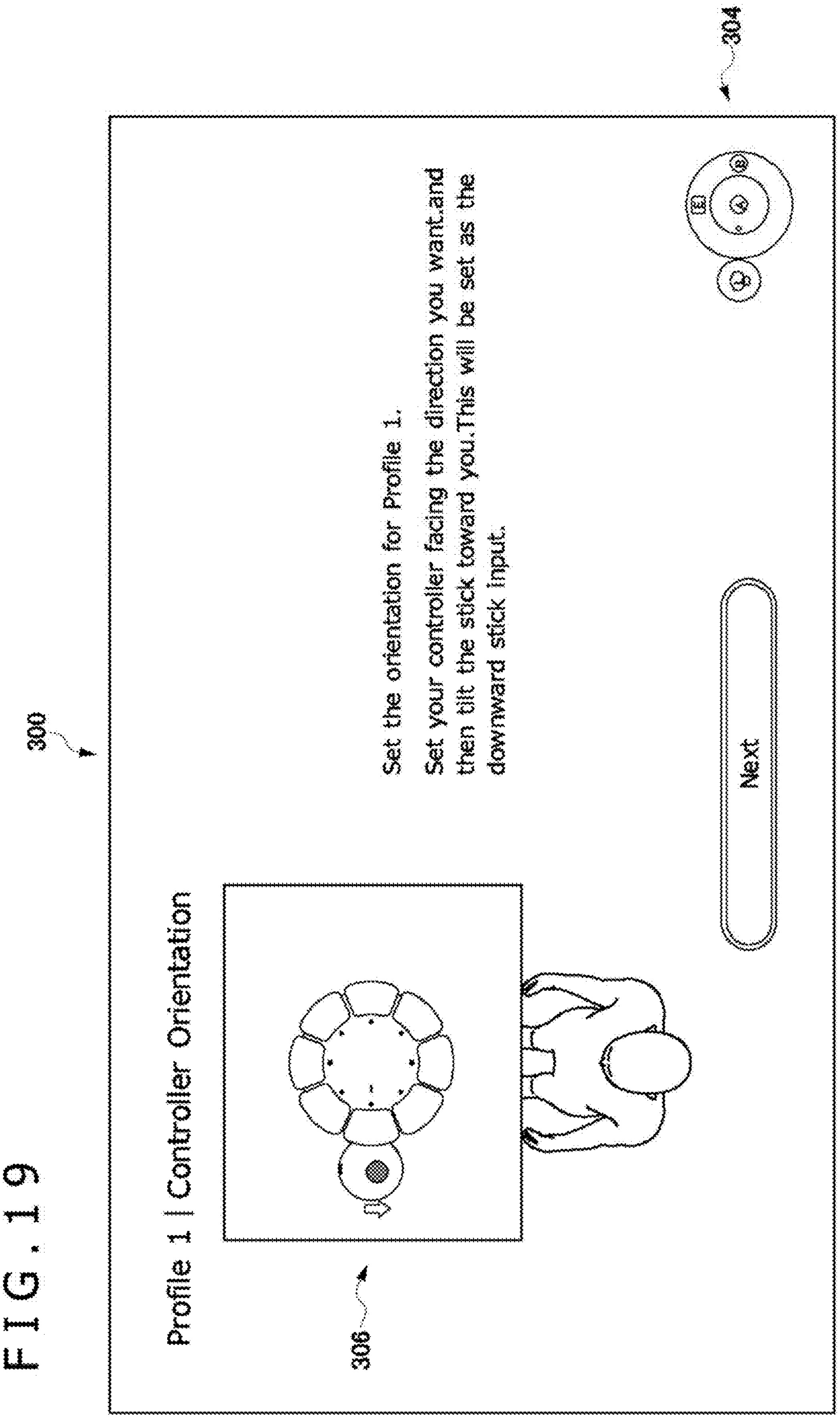
FIG. 19 is a figure depicting an example of the orientation screen according to a modification example.

A state in which the controller 18 is arranged in a freely-selected orientation can also be said to be a state where the analog stick section 402 and the button section 404 are arranged in a freely-selected positional relation desired by a user. For example, the orientation may correspond to any one of the four patterns depicted in the position pattern image 302 in FIG. 9. The input operation in the predetermined direction may be operation to tilt the analog stick 403 toward the user her/himself. FIG. 19 depicts an example of the orientation screen 300 according to a modification example. The orientation screen 300 according to the modification example includes contents prompting a user to tilt the analog stick 403 toward her/his side. On the basis of an output value in the X-axis direction and an output value in the Y-axis direction that accompany tilt operation of the analog stick 403 detected while the orientation screen 300 is displayed, the posture determining section 222 may determine the positional relation between the analog stick section 402 and the button section 404.

For example, it is supposed here that, as depicted in FIG. 4, the X-axis direction output value is a value from 0 to 255 (the output value of the return position 174 is 128) and that the Y-axis direction output value is a value from 0 to 255 (the output value of the return position 174 is 128). In this case, in a case where (X-axis direction output value, Y-axis direction output value) approximates to (128, 255), as depicted in "Default" of the position pattern image 302 in FIG. 9, the posture determining section 222 may assess that the current posture is a posture in which the analog stick section 402 is arranged to the left of the button section 404. In addition, in a case where (X-axis direction output value, Y-axis direction output value) approximates to (255, 128), as depicted in "+90" of the position pattern image 302 in FIG. 9, the posture determining section 222 may assess that the current posture is a posture in which the analog stick section 402 is arranged to the north of the button section 404.

In addition, in a case where (X-axis direction output value, Y-axis direction output value) approximates to (128, 0), as depicted in "+180" of the position pattern image 302 in FIG. 9, the posture determining section 222 may assess that the current posture is a posture in which the analog stick section 402 is arranged to the right of the button section 404. In addition, in a case where (X-axis direction output value, Y-axis direction output value) approximates to (0, 128), as depicted in "+270" of the position pattern image 302 in FIG. 9, the posture determining section 222 may assess that the current posture is a posture in which the analog stick section 402 is arranged to the south of the button section 404.

A second modification example is explained. It is supposed that the toggle mode according to the embodiment described above is one in which the input state of a button continues. As a modification example, the toggle mode may be one in which the input state of a button continues intermittently in a partial period or the entire period after the button is pressed. Stated differently, continuing intermittently may mean that the input state of the button continues with intervals (non-input states) of a predetermined length of time therein. For example, upon detection of short-pressing operation on a toggle mode button, the operation information generating section 114 of the controller 18 may consecutively generate operation information representing that the toggle mode button is in the input state in a predetermined first period, not generate the operation information representing that the toggle mode button is in the input state in the following predetermined second period, and repeat this.

A third modification example is explained. The embodiment described above depicts the analog stick section 402 (the analog stick 403) as the target of positioning and sensitivity adjustment. The technical idea related to positioning and sensitivity adjustment in the embodiment can be applied to various operation members whose input operation by a user is detected as information on a two-dimensional plane. For example, the controller 18 may include a slide operation member instead of the analog stick section 402. The slide operation member may be an operation member whose slider section can be slid from the initial position to a freely-selected direction desired by a user or in a predetermined direction. In addition, an operation member whose input operation by a user is detected as information on a two-dimensional plane may include a trigger button. The trigger button may be a pivotably-supported trigger-type button, and may be one that outputs a value according to a pivot amount. The controller 18 may include a trigger button instead of the analog stick section 402. In addition, the controller 18 may include both the analog stick section 402 and the trigger button as the operation member described above.

Any combinations of the embodiment and modification examples of mentioned above also are useful as embodiments of the present disclosure. New embodiments generated by the combinations combine respective effects of combined embodiments and modification examples. In addition, it is also understood by those skilled in the art that functions that should be attained by each constituent requirement described in claims are realized singly by each constituent element or realized by cooperation between the constituent elements depicted in the embodiment and modification examples.

The technical ideas described in the embodiment and modification examples described above can be expressed as examples described in the following respective items.

[Technology 1]

An information processing apparatus connected with an operation apparatus including a first operation member whose input operation by a user is detected as information on a two-dimensional plane and a second operation member different from the first operation member, the information processing apparatus including:

a determining section that determines a positional relation between the first operation member and the second operation member according to input operation on the operation apparatus in a predetermined mode; and a setting information registering section that causes the operation apparatus to store setting information including information regarding the positional relation between the first operation member and the second operation member.

According to this information processing apparatus, the degree of freedom of the posture of the operation apparatus can be enhanced, and, stated differently, the posture of the operation apparatus that contributes to the convenience for the user can be realized.

[Technology 2]

The information processing apparatus according to technology 1, further including:

a screen display section that causes a screen to be displayed in the predetermined mode, the screen including information representing multiple patterns of the positional relation between the first operation member and the second operation member, in which the determining section determines the positional relation between the first operation member and the second operation member according to a pattern selected on the screen.

According to this information processing apparatus, the user can easily input the posture of the operation apparatus to the information processing apparatus.

[Technology 3]

The information processing apparatus according to technology 1, in which the determining section determines the positional relation between the first operation member and the second operation member according to input operation of the first operation member in a predetermined direction in the predetermined mode in a state where the operation apparatus is arranged in a freely-selected orientation.

According to this information processing apparatus, the user can easily input the posture of the operation apparatus to the information processing apparatus.

[Technology 4]

An information processing apparatus including:

a processor, in which the information processing apparatus is connected with an operation apparatus including a first operation member whose input operation by a user is detected as information on a two-dimensional plane and a second operation member different from the first operation member, the processor determines a positional relation between the first operation member and the second operation member according to input operation on the operation apparatus in a predetermined mode, and the processor causes the operation apparatus to store setting information including information regarding the positional relation between the first operation member and the second operation member.

According to this information processing apparatus, the degree of freedom of the posture of the operation apparatus can be enhanced, and, stated differently, the posture of the operation apparatus that contributes to the convenience for the user can be realized.

[Technology 5]

An operation apparatus including:

a first operation member whose input operation by a user is detected as information on a two-dimensional plane;

a second operation member different from the first operation member;

a setting information storage section that stores setting information which is transmitted from an external information processing apparatus and which includes information regarding a positional relation between the first operation member and the second operation member; and a transmitting section that transmits, to the information processing apparatus, a value which is related to input operation on the first operation member and which is based on the positional relation between the first operation member and the second operation member.

According to this operation apparatus, the degree of freedom of the posture of the operation apparatus can be enhanced, and, stated differently, the posture of the operation apparatus that contributes to the convenience for the user can be realized.

[Technology 6]

The operation apparatus according to technology 5, in which the first operation member is arranged to protrude from an outer edge of the second operation member.

According to this operation apparatus, the convenience of the operation apparatus can be enhanced by allowing adjustment of the positional relation between the first operation member and the second operation member such that the positional relation contributes to the convenience for the user.

[Technology 7]

The operation apparatus according to technology 5 or 6, further including:

a calibrating section that derives a value to be input to the information processing apparatus, by calibrating, on a basis of the positional relation between the first operation member and the second operation member, a value based on operation input to the first operation member.

According to this operation apparatus, an appropriate value according to the posture of the operation apparatus can be input to the information processing apparatus, and the degree of freedom of the posture of the operation apparatus can be enhanced.

[Technology 8]

An information processing method including:

by an information processing apparatus connected with an operation apparatus including a first operation member whose input operation by a user is detected as information on a two-dimensional plane and a second operation member different from the first operation member, a step of determining a positional relation between the first operation member and the second operation member according to input operation on the operation apparatus in a predetermined mode; and a step of causing the operation apparatus to store setting information including information regarding the positional relation between the first operation member and the second operation member.

According to this information processing method, the degree of freedom of the posture of the operation apparatus can be enhanced, and, stated differently, the posture of the operation apparatus that contributes to the convenience for the user can be realized.

[Technology 9]

A computer program for causing an information processing apparatus connected with an operation apparatus including a first operation member whose input operation by a user is detected as information on a two-dimensional plane and a second operation member different from the first operation member to realize:

a function to determine a positional relation between the first operation member and the second operation member according to input operation on the operation apparatus in a predetermined mode; and a function to cause the operation apparatus to store setting information including information regarding the positional relation between the first operation member and the second operation member.

According to this computer program, it is possible to realize the information processing apparatus that enhances the degree of freedom of the posture of the operation apparatus, and, stated differently, realizes the posture of the operation apparatus that contributes to the convenience for the user.

The present disclosure can be applied to an information processing apparatus, an operation apparatus, an information processing system, or the like.

What is claimed is:

1. An information processing apparatus connected with an operation apparatus including a first operation member whose input operation by a user is detected as information on a two-dimensional plane and a second operation member different from the first operation member, the information processing apparatus comprising:

a determining section that determines a positional relation between the first operation member and the second operation member according to input operation on the operation apparatus in a predetermined mode, wherein the determining section determines the positional relation between the first operation member and the second operation member according to the input operation of the first operation member in a predetermined direction in the predetermined mode in a state where the operation apparatus is arranged in a freely-selected orientation; and a setting information registering section that causes the operation apparatus to store setting information including information regarding the positional relation between the first operation member and the second operation member.

2. The information processing apparatus according to claim 1, further comprising:

a screen display section that causes a screen to be displayed in the predetermined mode, the screen including information representing multiple patterns of the positional relation between the first operation member and the second operation member, wherein the determining section determines the positional relation between the first operation member and the second operation member according to a pattern selected on the screen.

3. The information processing apparatus according to claim 1, wherein the first operation member comprises an analog stick section of a controller and the second operation member comprises a button section of the controller.

4. The information processing apparatus according to claim 3, wherein the setting information comprises button assignment information representing functions assigned to a plurality of buttons on the button section on the second operation member.

5. The information processing apparatus according to claim 3, further comprising an assessing section that assesses whether a preset essential function required for operating software is assigned or unassigned to one or more buttons on the button section.

6. The information processing apparatus according to claim 3, wherein at least one button of a plurality of buttons on the button section is configured to set the information processing apparatus into a toggle mode wherein a single pressing operation of the at least one button triggers a simulation of an input state of the button.

7. The information processing apparatus according to claim 1, wherein the first operation member comprises an analog stick.

8. The information processing apparatus according to claim 1, wherein the second operation member comprises a circular, rectangular, or elliptical main body housing a plurality of buttons surrounding a central button.

9. The information processing apparatus according to claim 8, wherein the plurality of buttons surrounding the central button comprises a profile button, wherein a press of the profile button for a predetermined amount of time overrides an applied profile and switches the operation apparatus to a default profile.

10. The information processing apparatus according to claim 1, wherein the second operation member comprises a circular light-emitting section surrounding a center button.

11. The information processing apparatus according to claim 10, wherein the circular light-emitting section is configured to emit a light of a predetermined color when the operation apparatus transitions to a profile edit mode.

12. The information processing apparatus according to claim 11, wherein the light of the predetermined color is yellow.

13. The information processing apparatus according to claim 1, further comprising a screen display section that displays a visual toggle feedback icon on a screen to indicate that an input state of a button that is set to a toggle mode is active.

14. The information processing apparatus according to claim 1, further comprising a sound output section that outputs a sensitivity suggestion sound when a sensitivity adjustment mode is active.

15. The information processing apparatus according to claim 14, wherein a pitch of the sensitivity suggestion sound increases as an adjusted sensitivity of the first operation member increases.

16. An information processing apparatus comprising:

a processor, wherein the information processing apparatus is connected with an operation apparatus including a first operation member whose input operation by a user is detected as information on a two-dimensional plane and a second operation member different from the first operation member, the processor determines a positional relation between the first operation member and the second operation member according to input operation on the operation apparatus in a predetermined mode, wherein the processor determines the positional relation between the first operation member and the second operation member according to the input operation of the first operation member in a predetermined direction in the predetermined mode in a state where the operation apparatus is arranged in a freely-selected orientation, and the processor transmits, to the operation apparatus, setting information including information regarding the positional relation between the first operation member and the second operation member.

17. An operation apparatus comprising:

a first operation member whose input operation by a user is detected as information on a two-dimensional plane;

a second operation member different from the first operation member, wherein the first operation member is arranged to protrude from an outer edge of the second operation member;

a setting information storage section that stores setting information which is transmitted from an external information processing apparatus and which includes information regarding a positional relation between the first operation member and the second operation member; and a transmitting section that transmits, to the information processing apparatus, a value which is related to input operation on the first operation member and which is based on the positional relation between the first operation member and the second operation member.

18. The operation apparatus according to claim 17, further comprising:

a calibrating section that derives a value to be input to the external information processing apparatus, by calibrating, on a basis of the positional relation between the first operation member and the second operation member, a value based on operation input to the first operation member.

19. An information processing method comprising:

by an information processing apparatus connected with an operation apparatus including a first operation member whose input operation by a user is detected as information on a two-dimensional plane and a second operation member different from the first operation member, determining a positional relation between the first operation member and the second operation member according to input operation on the operation apparatus in a predetermined mode, wherein determining the positional relation between the first operation member and the second operation member according to the input operation of the first operation member in a predetermined direction in the predetermined mode in a state where the operation apparatus is arranged in a freely-selected orientation; and causing the operation apparatus to store setting information including information regarding the positional relation between the first operation member and the second operation member.

20. One or more non-transitory computer storage media encoded with computer program instructions that when executed by one or more computers cause the one or more computers to perform operations comprising:

determining a positional relation between a first operation member and a second operation member according to input operation on an operation apparatus in a predetermined mode, wherein the operation apparatus includes the first operation member whose input operation by a user is detected as information on a two-dimensional plane and a second operation member different from the first operation member and wherein determining the positional relation between the first operation member and the second operation member according to the input operation of the first operation member in a predetermined direction in the predetermined mode in a state where the operation apparatus is arranged in a freely-selected orientation; and causing the operation apparatus to store setting information including information regarding the positional relation between the first operation member and the second operation member.

* * * * *